United States Patent [19]

Watanabe et al.

[11] Patent Number: 4,873,760

[45] Date of Patent: Oct. 17, 1989

[54] VESSEL LID MOUNTING AND DEMOUNTING APPARATUS

[75] Inventors: Naoto Watanabe, Omiya; Akira Tanaka; Takayuki Matsumoto, both of Yokohama; Yutaka Ohmura, Yokohama; Hisao Kojima, Yokohama, all of Japan

[73] Assignee: Ishikawajima-Harima Heavy Industries Co., Ltd., Tokyo, Japan

[21] Appl. No.: 139,270

[22] Filed: Dec. 29, 1987

[30] Foreign Application Priority Data

Dec. 29, 1986 [JP] Japan .................................. 61-311168
Jan. 10, 1987 [JP] Japan .................................... 62-3848
Jan. 10, 1987 [JP] Japan .................................... 62-3849

[51] Int. Cl.$^4$ ...................... B23P 21/00; B23P 19/04; G21C 19/00
[52] U.S. Cl. ........................................ 29/714; 29/240; 29/723; 29/711; 29/792; 376/260
[58] Field of Search ................. 29/240, 703, 723, 726, 29/709, 711, 712, 714, 791, 792; 81/57.36; 376/260, 263, 463

[56] References Cited

U.S. PATENT DOCUMENTS 4,520,446 5/1985 Sato ....................................... 29/723

FOREIGN PATENT DOCUMENTS 2100496 12/1982 Japan .................................. 376/260
58-17737 4/1983 Japan .
59-11433 3/1984 Japan .
0000672 4/1980 World Int. Prop. O. ............ 29/723

Primary Examiner—Bruce Y. Arnold
Assistant Examiner—Ronald M. Kachmarik
Attorney, Agent, or Firm—Oblon, Spivak, McClelland, Maier & Neustadt

[57] ABSTRACT

An apparatus for mounting and demounting a lid of a vessel on and from a body thereof. The lid and the body are fastened to each other by a plurality of stud bolt and nut assemblies. A turntable is supported on a sling to be fixed to the lid, for turning movement in a horizontal plane about a vertical axis passing through a center of the lid. A plurality of operating units are supported by the turntable and are arranged in circumferentially spaced relation on a circle having a diameter equal to that of a pitch circle of the stud bolts. Each of the operating units includes a device for transporting the nuts to and from the stud bolts, and a device for attaching and detaching the stud bolts to and from an end flange of the body of the vessel. A positioning arrangement is provided for moving the turntable in the horizontal plane relatively to the sling so as to bring the operating units into vertical alignment with the stud bolts.

19 Claims, 17 Drawing Sheets

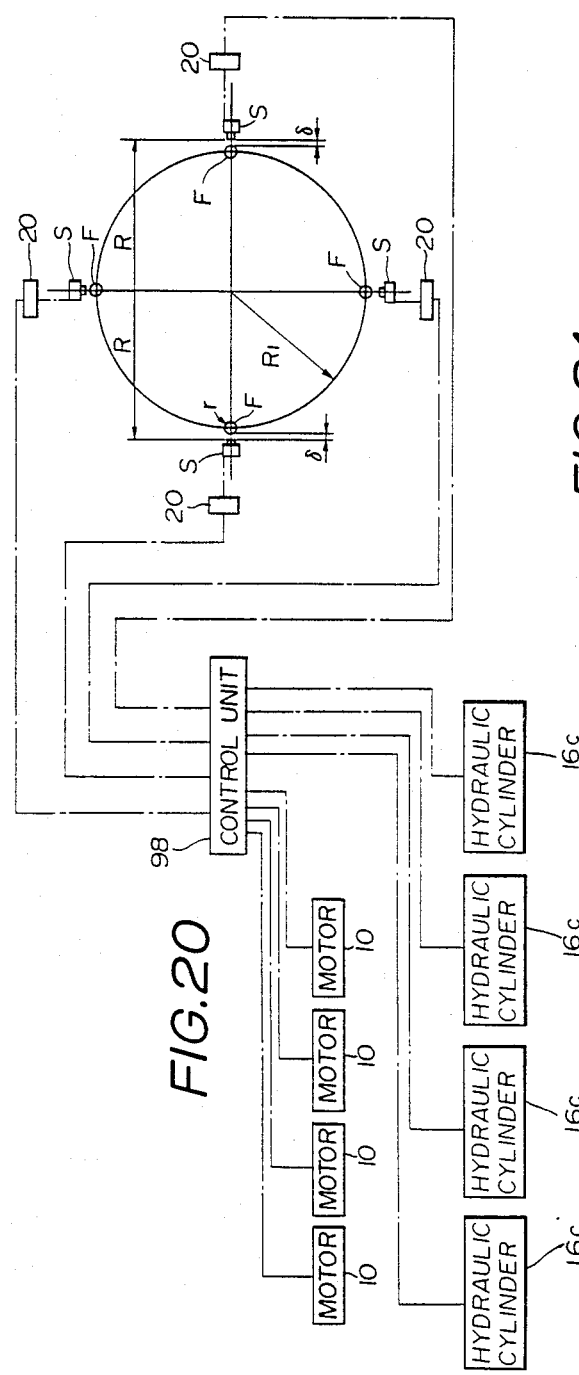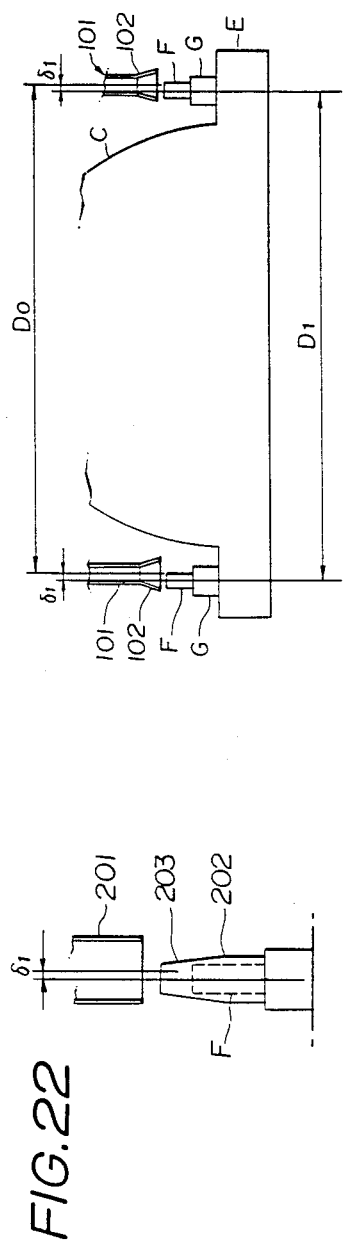
FIG.20
FIG.21
FIG.22

VESSEL LID MOUNTING AND DEMOUNTING APPARATUS

FIELD OF THE INVENTION

The present invention relates to an apparatus for mounting and demounting a lid of a vessel on and from a body thereof, the lid and the body having their respective ring-like end flanges fastened to each other by means of a plurality of stud bolt and nut assemblies.

DISCUSSION OF THE BACKGROUND OF THE INVENTION

Referring to FIGS. 1 through 5 of the drawings, there is illustrated a conventional pressure vessel of a boiling water reactor, which is an example of vessels to which the invention is applicable. In FIG. 1, the reactor pressure vessel, generally designated by the reference character A, comprises a body B and a lid C mounted on a top of the body B. The body B and the lid C have their respective end flanges D and E which are fastened to each other by means of a plurality of, e.g. 92, stud bolt and nut assemblies arranged in circumferentially equidistantly spaced relation on a pitch circle concentric to a center of the lid C. Each of the stud bolt and nut assemblies includes a stud bolt F having an axis thereof extending vertically and a nut G threadedly engaged with the stud bolt F. A plurality of sling fittings Ca are fixedly secured to an outer surface of the lid C at an intermediate height thereof, and project from the outer surface.

As clearly shown in FIG. 2, each of the stud bolts F has a threaded portion Fa formed at a lower end of the stud bolt F and a threaded portion Fb formed adjacent an upper end of the stud bolt F. The stud bolt F is formed at its upper and with a threaded grip portion Fc which is adapted to be gripped by a stud tensioner. The tensioner is for gripping the threaded grip portion Fc of the stud bolt F to pull up the same. The arrangement is such that the lower threaded portions Fa of the respective stud bolts F are threadedly engaged respectively with threaded bores in the flange D of the body B, the nuts G are threadedly engaged respectively with the upper threaded portions Fb of the respective stud bolts F, and the nuts G are tightened against the upper surface of the flange E of the lid C through washers H to thereby fix the lid C to the body B.

It is necessary for the reactor pressure vessel A to demount the lid C from the body B when fuel rods are replaced by new ones after initiation of the operation of the reactor, or when regular inspection is effected on the reactor. Demounting of the lid C from the body B is performed by the steps of the procedure illustrated in FIGS. 3 through 5.

At the outset, as shown in FIG. 3, the nuts G are successively loosened and released from threaded engagement with the respective upper threaded portions Fb of the stud bolts F, while pulling up the stud bolts F by the stud tensioner. In this connection, the sections of the respective upper threaded portions Fb exposed to the outside are beforehand cleaned by brushes or the like to prevent the nuts G from being seized to the upper threaded portions Fb. The nuts G and the washers H are then removed respectively from the stud bolts F. Subsequently, a crane, not shown, is employed to lift the lid C vertically along the stud bolts F and out of the latter, so that the lid C is demounted from the body B, as shown in FIG. 4. The demounted lid C is conveyed to a predetermined storage location.

Subsequently, as shown in FIG. 5, the stud bolts F projecting upwardly from the flange D of the body B are released from threaded engagement with the flange D and are detached therefrom. The detached stud bolts F are conveyed to a predetermined storage location in a manner like the lid C. Thus, all of the components are removed from the top of the body B, and then the fuel rod replacement operation or the inspection operation is effected.

Mounting of the lid C on the body B is performed by the steps of procedure reverse to the above-mentioned steps of procedure by which the lid C is demounted from the body B.

Locations of connection between the lid C and the body B by means of the stud bolts F are extremely numerous in number such as, for example, 92 in all about the lid C. Moreover, in general, each stud bolt F and each nut G are considerably large in size and heavy in weight, although they vary depending upon the size of the pressure vessel. For example, the stud bolt F having its length on the order of 1.8 meters becomes 250 Kg in weight. Furthermore, attaching and detaching operations of the stud bolts F and the nuts G are wholly effected within a controlled area. Thus, it is required to promote simplification and automatization of the operations in an attempt to shorten the working period and to reduce exposure of operators.

In order to meet the above requirements, the same assignee as that of the present invention has proposed some appropriate techniques in Japanese Utility Model Publication No. 58-17737 entitled "Attaching And Detaching Device For Stud Bolts" and in Japanese Patent Publication No. 59-11433 entitled "Nut Attaching And Detaching Operation Equipment". By such techniques, an attempt has been made at elimination or reduction of labor, shortening of the working period and reduction in exposure of operators, during the attaching and detaching operation of stud bolts and nuts.

Extremely difficult problems are encountered in the designing and manufacturing of a vessel lid mounting and demounting apparatus in which attaching and detaching of stud bolts and nuts are automatized. Specifically, as described previously, the stud bolt and nut assemblies used to connect the body B and the lid C of the reactor pressure vessel A to each other are very numerous in number, i.e., 92 in all about the single lid C. If an attempt is made to effect attaching and detaching of many of such stud bolts F and nuts G for a short period of time, it may be considered that a plurality of operating units each effecting automatic attaching and detaching of the stud bolts F and the nuts G are arranged and are operated simultaneously.

It is required for bolts and nuts employed in the reactor pressure vessel, however, to ensure higher reliability of tightening performance and the like. To this end, it is necessary to avoid problems such that the stud bolts F and the nuts G interfere with peripheral equipment or operating units during the attaching and detaching operation so that the threads on the stud bolts F and nuts G are damaged. It is also necessary that respective combinations of the stud bolts F and the nuts B before the lid C is demounted from the body B are maintained unchanged also after the lid C is demounted from the body B and is again mounted thereon, and that the removed stud bolts F and nuts G are used without failure at their respective initial locations, i.e., at the same locations as those before removal.

Accordingly, if a plurality of operating units are arranged as described above in an attempt to shorten the period of time required for the attaching and detaching operation of the stud bolts F and the nuts G, it is desired to correctly position the plurality of operating units at the stud bolts F and the nuts G, i.e., to vertically align the operating units with the stud bolts F and the nuts G, in order to prevent the operating units from inadvertently interfering with the threads on such stud bolts and nuts during the attaching and detaching operation thereof. Should an attempt be made to fulfill such desire, a mechanism for positioning the operating units would become complicated in structure, and would become extremely expensive. Otherwise, careful or fine adjustment in position would be necessary for each of the operating units, resulting in a prolongation of time required for the adjustment in position.

SUMMARY OF THE INVENTION

It is an object of the invention to provide an apparatus for mounting and demounting a lid of a vessel on and from a body thereof, in which a plurality of operating units each for effecting attaching and detaching of stud bolts and nuts can correctly be positioned simultaneously at the stud bolts and the nuts, to shorten a period of time required for positioning operation of the operating units.

It is another object of the invention to provide the above-mentioned apparatus in which positioning of the operating units can be effected by an arrangement relatively simple in structure, making it possible to reduce the manufacturing cost.

According to the invention, there is provided an apparatus for mounting and demounting a lid of a vessel on and from a body thereof, the lid and the body having their respective ring-like end flanges fastened to each other by means of a plurality of stud bolt and nut assemblies arranged in circumferentially spaced relation on a pitch circle concentric to a center of the lid, each of the stud bolt and nut assemblies including a stud bolt having an axis thereof extending vertically, and at least one nut threadedly engageable with the stud bolt, the apparatus comprising:

a sling to be fixed to the lid;

a turntable supported on the sling for turning movement in a horizontal plane relative to the sling about a vertical axis passing through a center of the pitch circle;

drive means mounted between the sling and the turntable for turning the same about the vertical axis;

a plurality of operating units supported by the turntable and arranged in circumferentially spaced relation on a circle concentric to the vertical axis, which circle has a diameter equal to that of the pitch circle, each of the operating units including nut transporting means for transporting the nuts to and from the respective stud bolts, and stud bolt attaching and detaching means for attaching and detaching the stud bolts to and from the end flange of the body of the vessel; and positioning means for moving the turntable in the horizontal plane relatively to the sling so as to bring the operating units into vertical alignment with the stud bolts.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 20 is a diagrammatic view showing a positioning arrangement having position sensors illustrated in FIGS. 7 and 9;

FIG. 21 is a fragmental schematic view of a modification of the positioning arrangement;

FIG. 22 is a fragmental view of another modification of the positioning arrangement.

DESCRIPTION OF THE PREFERRED EMBODIMENTS

The invention will be described in detail, by way of mere example, with reference to FIGS. 6 through 21.

Figure 1:
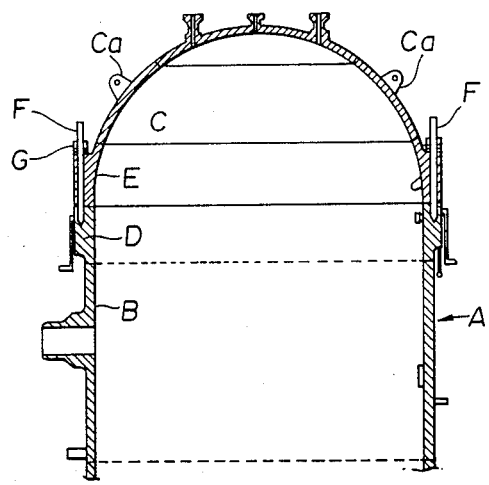
FIG. 1 is a fragmental, vertical cross-sectional view of a conventional reactor pressure vessel to which the invention is applicable.
Figure 2:
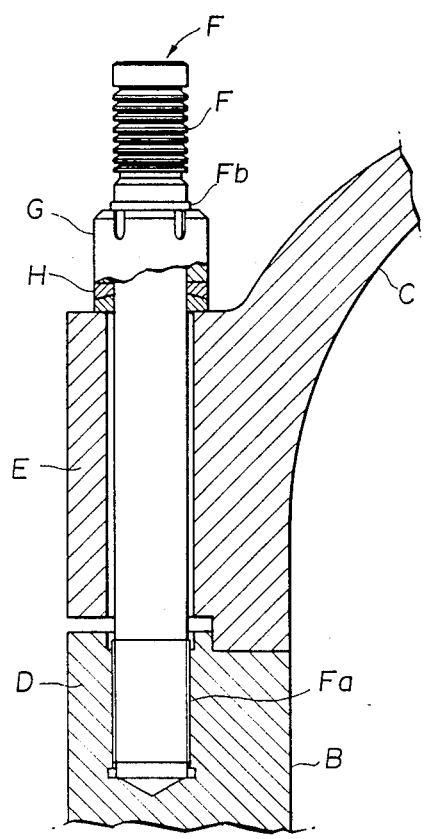
FIG. 2 is an enlarged fragmental cross-sectional view showing one of a plurality of stud bolt and nut assemblies by which a lid and a body of the vessel illustrated in FIG. 1 are fastened to each other.
Figure 3:
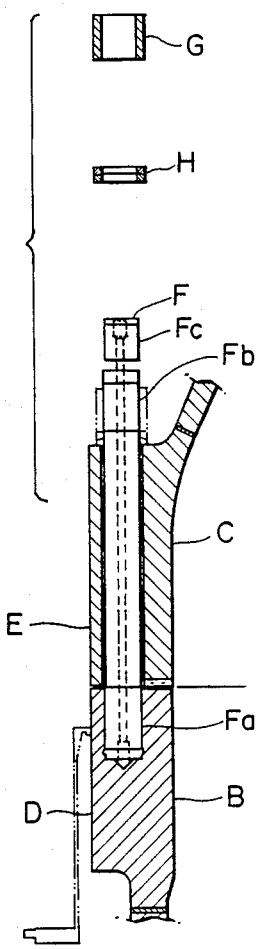
FIGS. 3 through 5 are fragmental cross-sectional views for explanation of the conventional steps of procedure of demounting the lid from the body illustrated in FIG. 1.
Figure 4:
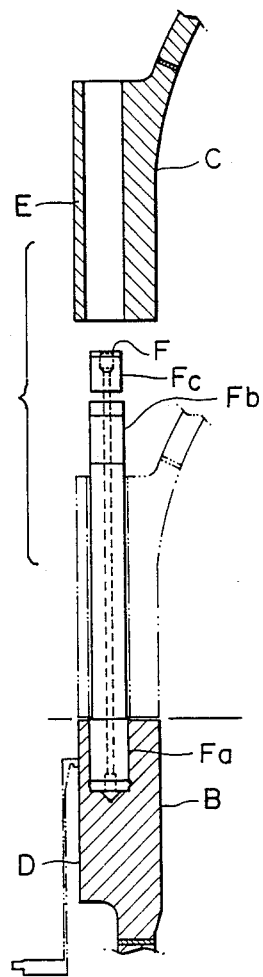
Figure 5:
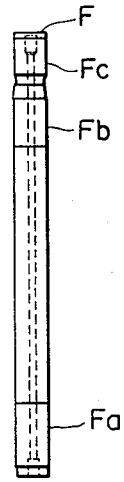
Figure 6:
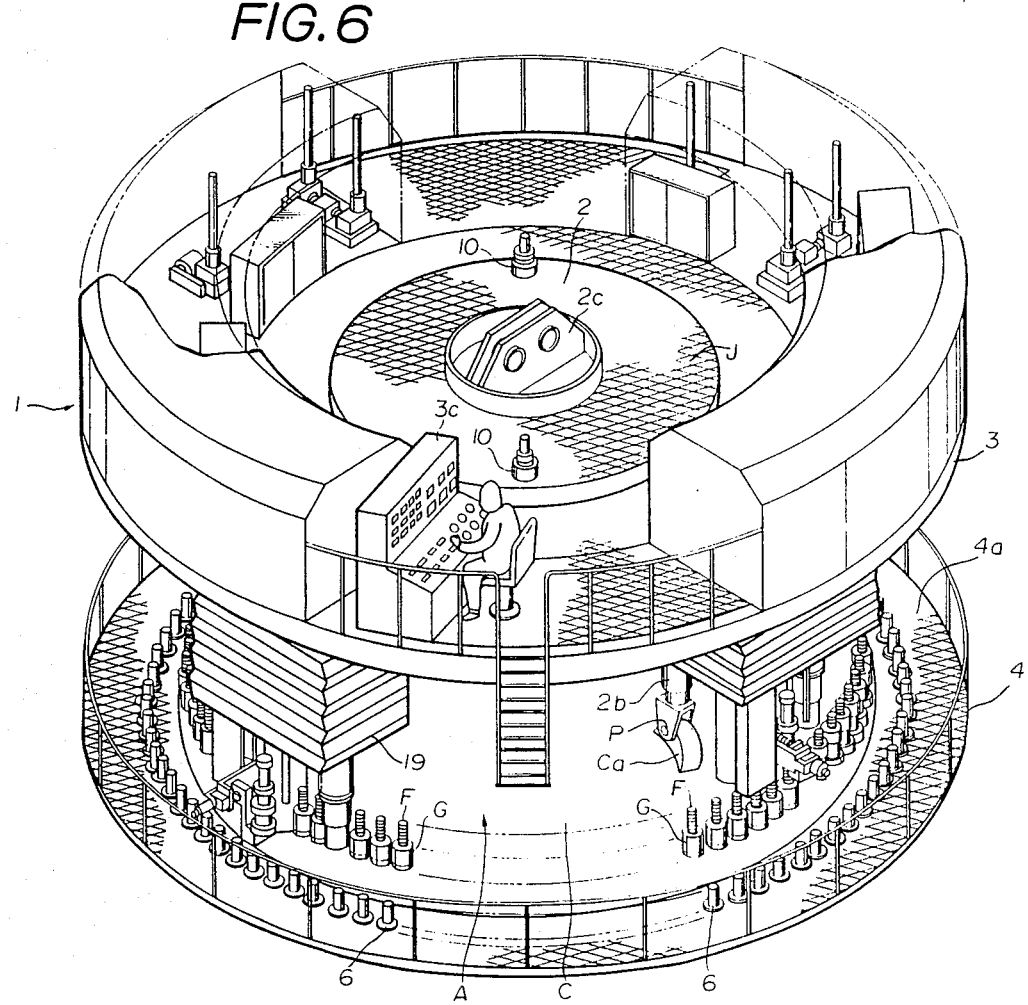
FIG. 6 is a perspective view of a vessel lid mounting and demounting apparatus according to an embodiment of the invention.
Figure 7:
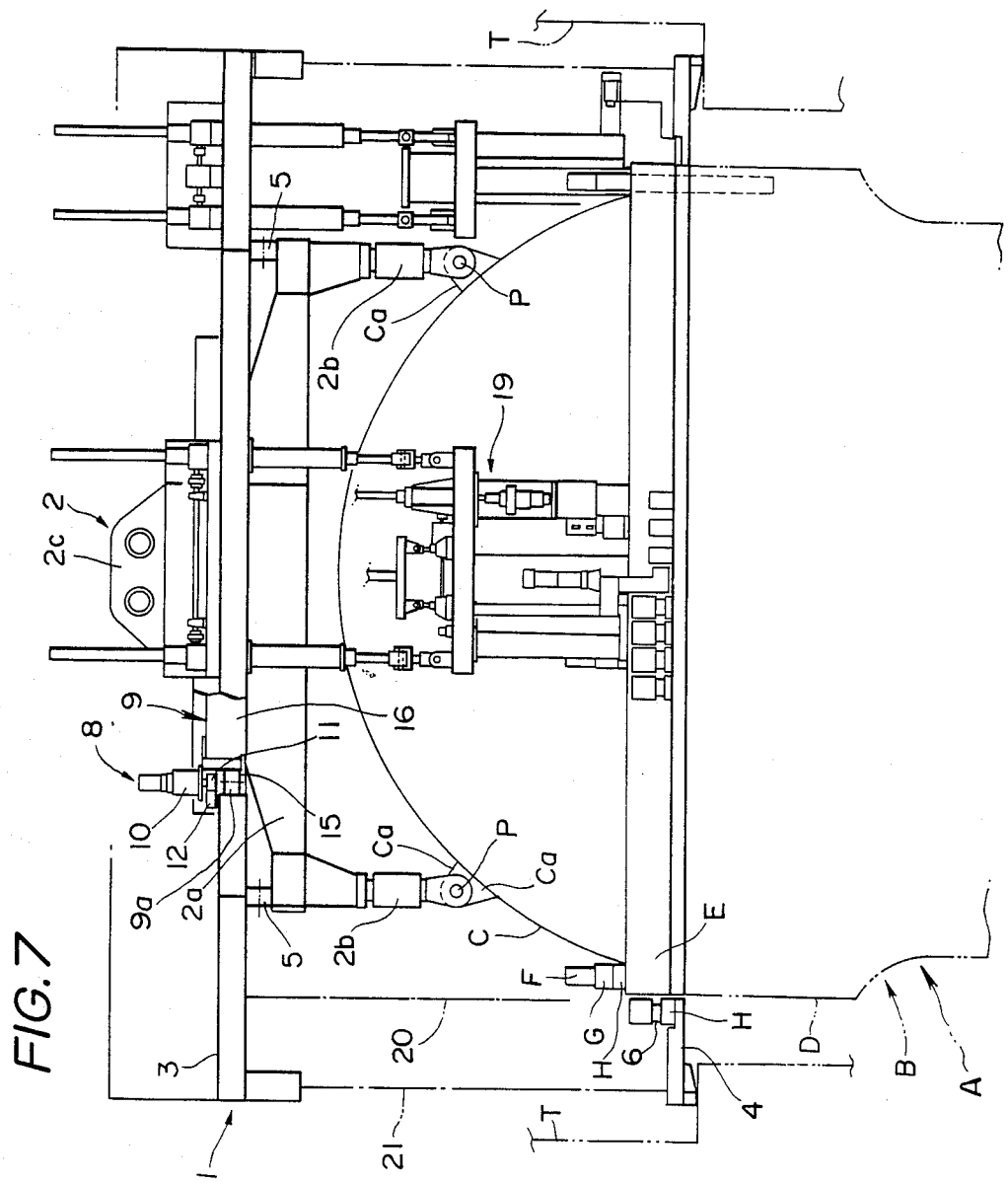
FIG. 7 is a somewhat diagrammatic front elevation view of the apparatus illustrated in FIG. 6.
Figure 8:
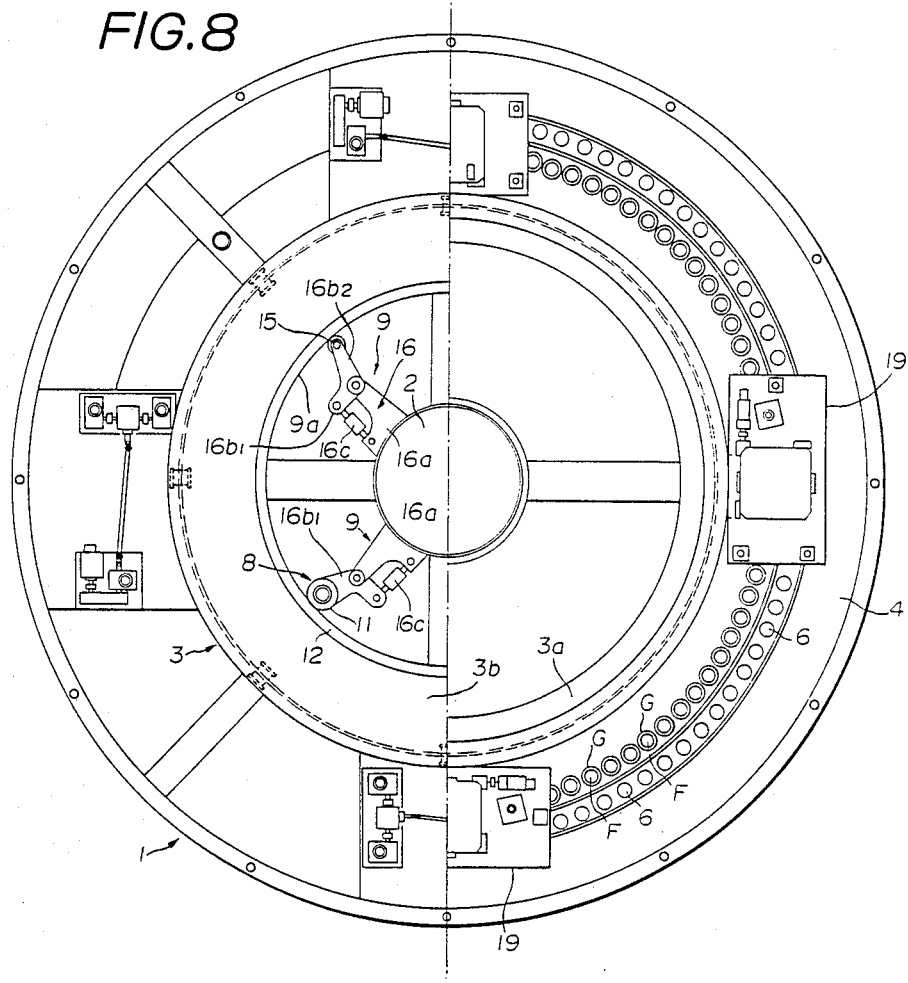
FIG. 8 is a top plan view of the apparatus illustrated in FIG. 6, with a half of a turntable removed to show a plurality of operating units.

Referring first to FIGS. 6 through 8, there is illustrated a vessel lid mounting and demounting apparatus 1 according to an embodiment of the invention which is applied to the reactor pressure vessel illustrated in FIG. 1. The apparatus 1 is designed to mount and demount of the lid C of the reactor pressure vessel A on and from the body B thereof. As described previously with reference to FIGS. 1 and 2, the body B and the lid C of the pressure vessel A have their respective ring-like end flanges D and E which are fastened to each other by means of a plurality of stud bolt and nut assemblies arranged in circumferentially equidistantly spaced relation on a pitch circle concentric to a center of the lid C. Each of the stud bolt and nut assemblies includes the stud bolt F, the nut G threadedly engaged with the stud bolt F, and one or more washers H fitted about the stud bolt F. The apparatus 1 is fundamentally composed of a sling 2 to be fixed to the lid C, a turntable 3 supported on the sling 2 for turning movement in a horizontal plane about a vertical axis passing through the center of the pitch circle of the stud bolts F, and a working scaffold device 4.

As shown in FIG. 7, the sling 2 comprises a frame $2a$, and at least three legs $2b$ depending respectively from a radially outward peripheral end of the frame $2a$. The legs $2b$ are adapted to be rigidly connected respectively to the sling fittings Ca on the lid C by respective pins P, to fix the sling 2 to the lid C. Each of the legs $2b$ is adjustable in length by known means.

A crane, not shown, is engageable with a sling fitting $2c$ provided at a center of the frame $2a$ of the sling 2, to hang up the entire apparatus 1. The sling fitting $2c$, the frame $2a$ and the like of the sling 2 are provided with a strength sufficient to support weight of the lid C and the turntable 3. Accordingly, with the lid C separated from the body B, the crane can hang up the sling fitting $2c$ to move or convey the lid C together with the apparatus 1. The sling 2 has its upper surface which is covered with a checker plate J, as shown in FIG. 6, to enable operators to stand on the sling 2 and to eliminate a gap between the sling 2 and the turntable 3.

As best shown in FIG. 8, the turntable 3 is annular in shape having a central opening through which the sling fitting $2c$ of the sling 2 passes. As will be seen from FIG. 9, the turntable 3 rests on rollers 5 which are arranged in circumferentially spaced relation about the center of the sling 2 and which are rotatably mounted on the upper surface of the sling 2, so that the turntable 3 is determined in its vertical position by the rollers 5. The turntable 3 is formed at its lower surface with an annular rail section $3a$ having a smooth surface with which the rollers 5 are in rolling contact. Thus, the turntable 3 is supported on the sling 2 for turning movement in the horizontal plane about the vertical axis passing through the center of the lid C, i.e., the center of the pitch circle of the stud bolts F. The turntable 3 has its upper surface which is covered with a checker plate $3b$, as shown in FIG. 6, like the sling 2. Arranged on the upper surface of the turntable 3 is an operating panel $3c$ for operating the apparatus 1.

The scaffold device 4 provides a scaffold for enabling operators to pass along the periphery of the lid C. The scaffold device 4 is annular in shape extending about the outer periphery of the flange of the lid C and having an inner diameter slightly larger than that of the pitch circle on which the stud bolts F are arranged. The scaffold device 4 has an outer peripheral lower surface which is adapted to rest on a structural portion T for the reactor pressure vessel A such as a bulkhead or the like, as shown in FIG. 7, so that the scaffold device 4 is supported on the structural portion T. The scaffold device 4 has its upper surface which is covered with a checker plate $4a$, as shown in FIG. 6.

Figure 9:
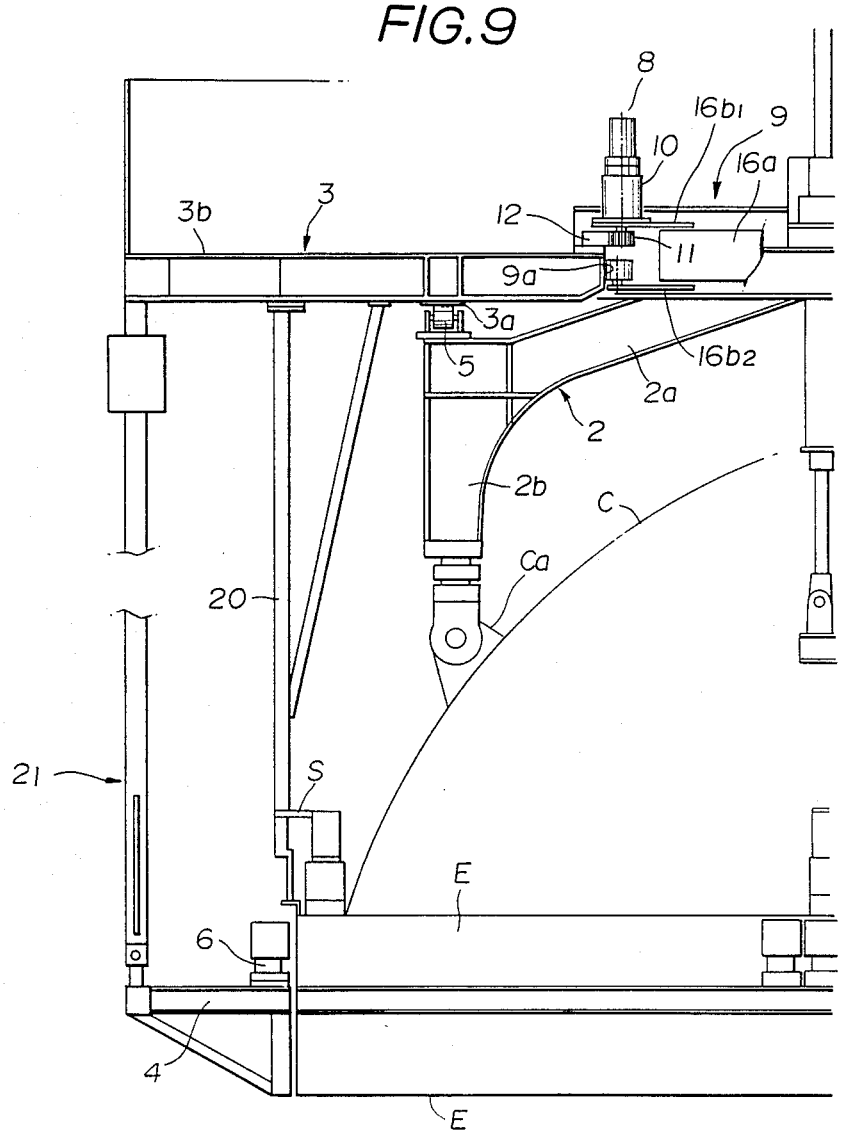
FIG. 9 is an enlarged view of a portion of the apparatus illustrated in FIG. 7.

As illustrated in FIGS. 7 through 9, the sling 2 has mounted thereon a plurality of, e.g. four, drive devices 8 for turning the turntable 3 about the vertical axis passing through the center of the lid C, and a plurality of, e.g., four, centering devices 9 for centering the turntable 3 so as to bring the center thereof into conformity with the vertical axis passing through the center of the lid C. The drive devices 8 and the centering devices 9 are arranged in circumferentially equidistantly spaced relation about the vertical axis passing through the center of the lid C.

As best shown in FIG. 9, each of the drive devices 8 comprises an electric motor 10 supported on the sling 2. A pinion 11 is fixedly mounted on an output shaft of the motor 10. A ring gear 12 is fixedly mounted on the turntable 3 in concentric relation thereto. The pinion 11 is in mesh with the ring gear 12. As the pinion 11 is rotated by the motor 10, the ring gear 12 in mesh with the pinion 11 is rotated in the same direction as that in which the pinion 11 is rotated.

As best shown in FIG. 8, the centering devices 9 comprises an annular reference surface $9a$ formed on the turntable 3 and extending in concentric relation to the vertical axis passing through the center of the lid C. The reference surface $9a$ is directed radially inwardly toward the center of the turntable 3. Each of the four centering devices 9 includes a roller 15 arranged in abutting relation to the reference surface $9a$. An actuator assembly 16 has an arm $16a$ which has its radially inward end fixedly secured to the sling 2 and which extends horizontally from the sling 2 radially outwardly toward the reference surface $9a$. A pair of upper and lower levers $16b_1$ and $16b_2$ (see FIG. 9) are pivotally mounted at their intermediate portions to a radially outward end of the arm $16a$. The roller 15 is rotatably mounted to one end of the lower lever $16b_1$. An actuator such as a hydraulic cylinder $16c$ is pivotally mounted to the arm $16a$. The hydraulic cylinder $16c$ has a piston rod pivotally connected to the other end of the lower lever $16b_1$. The hydraulic cylinder $16c$ is operative in response to signals from position detecting devices subsequently to be described, to pivotally move the upper and lower levers $16b_1$ and $16b_2$. By such pivotal movement, the roller 15 is moved radially and is caused to urge the reference surface $9a$, thereby translating the turntable 3 in the horizontal plane relative to the sling 2 so as to bring the center of the turntable 3 into conformity with the vertical axis passing through the center of the lid C.

As clearly seen from FIGS. 8 and 9, the above-described motor 10 of each of the drive devices 8 is mounted on the upper lever $16b_1$ of the actuator assembly 16 of a corresponding one of the centering devices 9. Thus, the pinion 11 mounted on the output shaft of the motor 10 is actuated by the hydraulic cylinder $16c$ to move between a first position where the pinion 11 is in mesh with the ring gear 12 and a second position where the pinion 11 is disengaged from the ring gear 12.

As shown in FIGS. 7 and 8, a plurality of, e.g. four operating units 19 are mounted on the turntable 3 and arranged in circumferentially equidistantly spaced relation on a circle which is concentric to the vertical axis passing through the center of the lid C and which has a diameter equal to that of the pitch circle of the stud bolts F. As schematically shown in FIG. 7, mounted also on the turntable 3 are a plurality of position detecting devices 20 (only one shown in FIG. 7). As will be described later, the position detecting devices 20 and the centering devices 9 constitute a positioning arrangement for positioning the turntable 3 with respect to the stud bolts F. The position detecting devices 20 are designed to detect a position of the turntable 3 relative to the lid C to generate signals representative of the position of the turntable 3. A plurality of scaffold holding devices 21 are mounted on the turntable 3 for holding the scaffold device 4 during a period for which the scaffold device 4 is set to a predetermined position relative to the lid C. After the scaffold device 4 is set to the predetermined position on the structural portion T for the reactor pressure vessel A, chains or the like of the respective holding devices 21 are removed from the scaffold devices 4. Thus, the scaffold device 4 is maintained separated from the turntable 3, during subsequent various operations.

Figure 10:
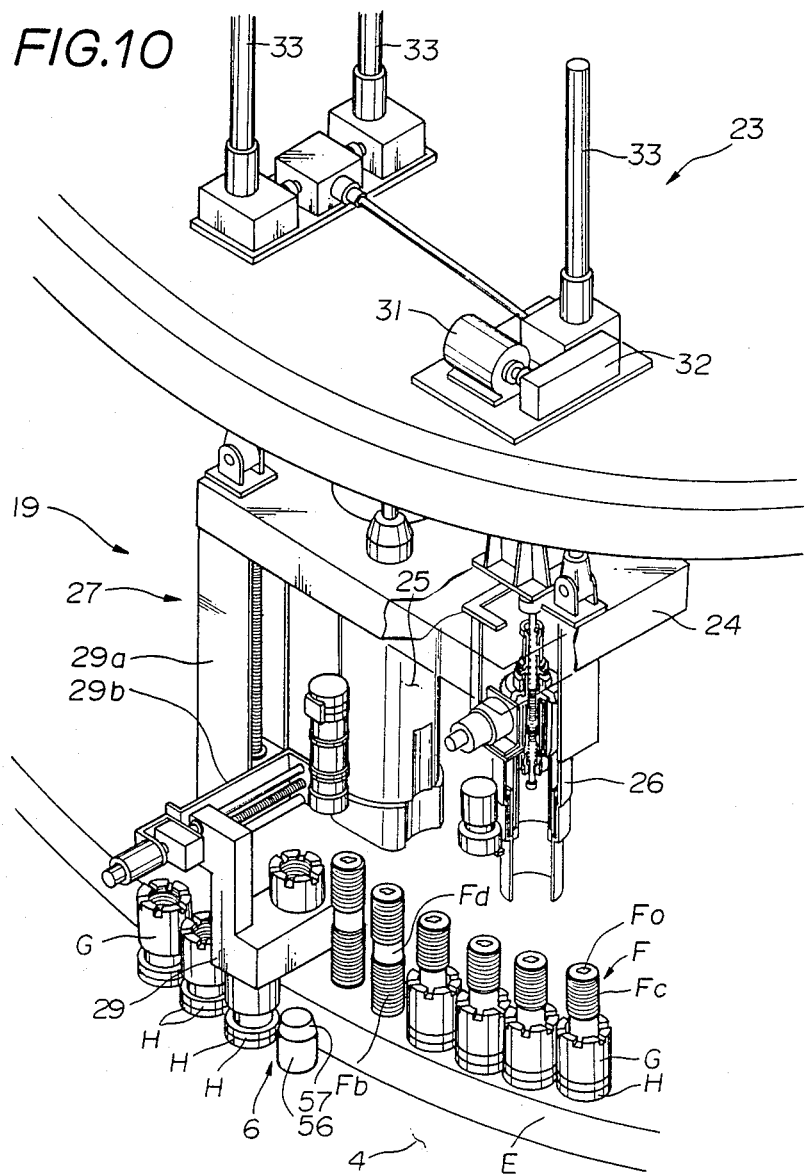
FIG. 10 is an enlarged perspective view of one of the operating units illustrated in FIGS. 8 and 9.

As shown in detail in FIG. 10, each of the operating units 19 comprises a unit elevating device 23 mounted on the turntable 3, and a unit table 24 which is moved vertically by the unit elevating device 23. The unit table 24 has mounted thereon a stud tensioner 25, a stud bolt attaching and detaching device 26, and a nut transporting device 27.

The unit elevating device 23 of each of the operating units 19 comprises an electric motor 31 mounted on the upper surface of the turntable 3. Three ball-nut jacks 33 are connected to the motor 31 through a speed-reduction mechanism 32 such that the jacks 33 are operated in a synchronized fashion, to vertically translate the unit table 24.

Figure 11:
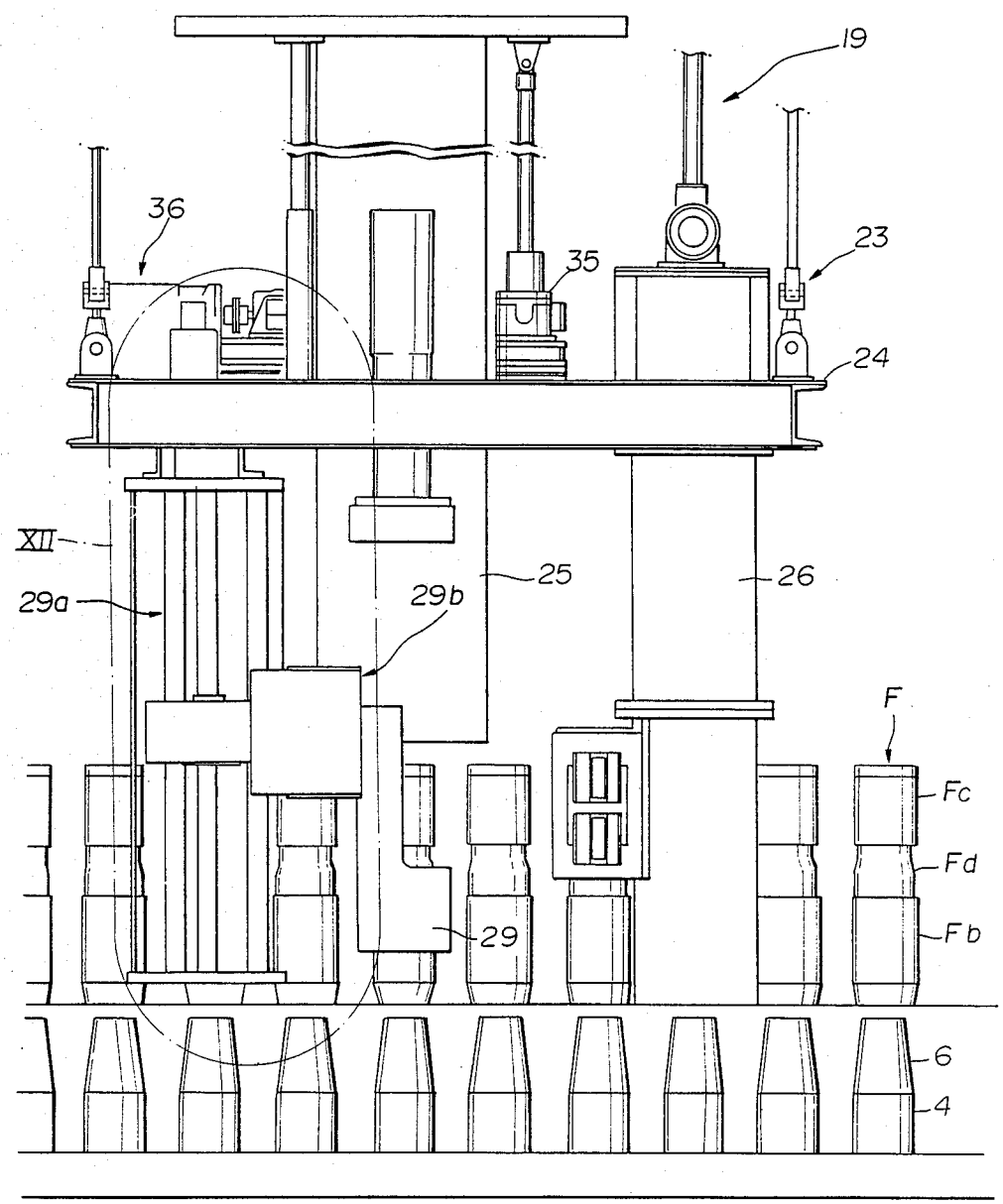
FIG. 11 is a front elevational view of the operating unit illustrated in FIG. 10.

The stud tensioned 25 of each of the operating units 19 is so arranged as to have a combination of a function of tensioning a corresponding one of the stud bolts F and a function of rotating a corresponding nut G while stretching the stud bolt F. A tensioner elevating mechanism 35 shown in FIG. 11 is associated with the stud tensioner 25 for moving the same vertically in such a manner that the stud tensioner 25 is moved vertically in synchronism with vertical movement of the nut G due to rotation thereof. The tensioner elevating mechanism 35 is driven by an electric motor 36.

The nut transporting device 27 of each of the operating units 19 will be described in detail with reference to FIGS. 10 through 15. As shown in FIG. 10, the nut transporting device 27 comprises a grip bracket 29 which is mounted in hanging relation to the unit table 24 for vertical movement and horizontally radial movement. The grip bracket 29 is engageable with a lower surface of a corresponding one of the nuts G which is released from the threaded engagement with the threaded portion Fb of a corresponding one of the stud bolts F, but which is maintained fitted about the stud bolt F, to support the nut G. A vertically moving mechanism 29a is associated with the grip bracket 29 for driving the same to move the grip bracket 29 vertically. A radially moving mechanism 29b is associated with the grip bracket 29 for driving the same to move the grip bracket 29 radially horizontally. A plurality of nut supports or pins 6 are arranged on the scaffold device 4, as elements common to all of the nut transporting devices 27 of the respective operating units 19. The pins 6 upstanding from an upper surface of the scaffold device 4 are located in radial alignment respectively with the stud bolts F in radially outwardly spaced relation thereto.

Figure 15:
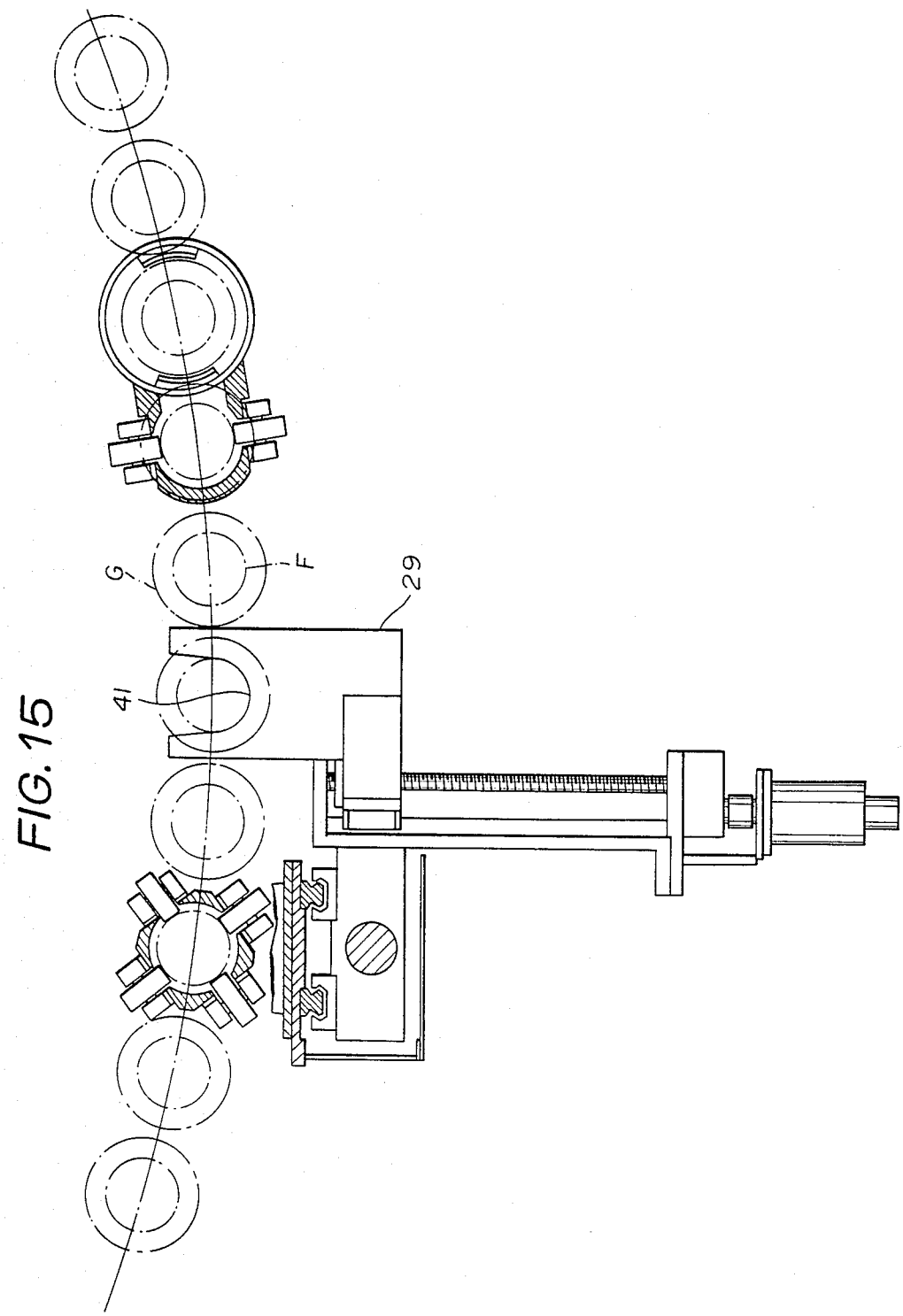
FIG. 15 is a plan view for explanation of the relationship between nuts and a grip bracket of the nut transporting device illustrated in FIG. 10.

The grip bracket 29 is provided in its radially inward tip with a U-shaped engaging recess 41, as shown in FIG. 15, which is capable of being loosely fitted about the stud bolt F. The engaging recess 41 opens radially inwardly toward the center of the pitch circle of the stud bolts F. The grip bracket 29 is also provided on its lower side with a washer attracting element 42, as shown in FIG. 13, which comprises, for example, a permanent magnet.

Figure 12:
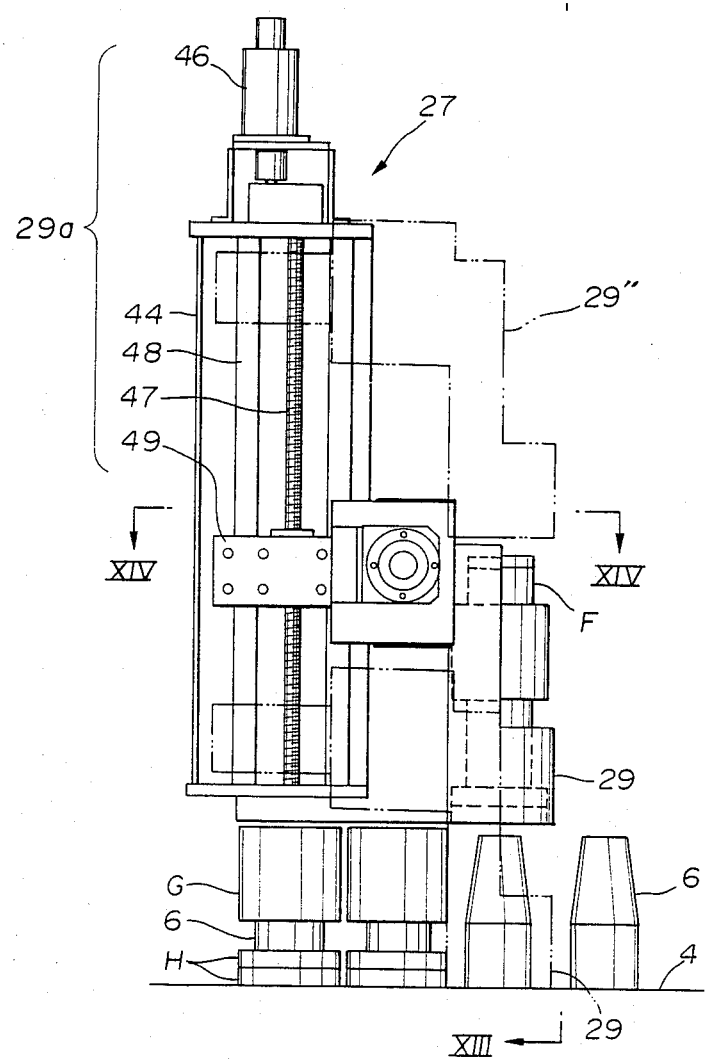
FIG. 12 is an enlarged view of a portion encircled by XII in FIG. 11, showing a nut transporting device.
Figure 14:
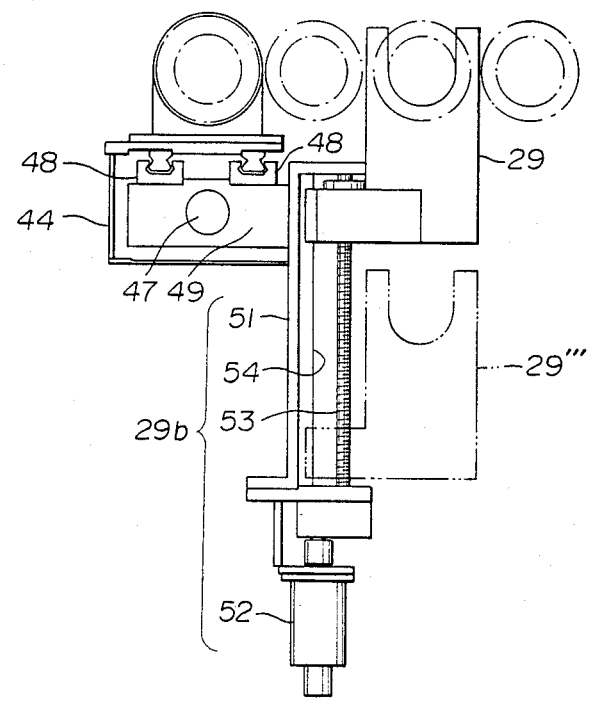
FIG. 14 is a view as viewed from the arrows XIV—XIV in FIG. 12.

As shown in detail in FIGS. 12 and 14, the vertically moving mechanism 29a comprises a support frame 44 depending from the unit table 24, and an electric motor 46 mounted on the unit table 24. A vertically extending screw rod 47 is rotatably mounted on the support frame 44 and is adapted to be rotated by the motor 46. An elevating block 49 is threadedly engaged with the screw rod 47 and is movable along a pair of vertical guide rails 48 which are fixedly mounted to the support frame 44. When the screw rod 47 is rotated by the motor 46 in one direction, the elevating block 49 is moved downwardly along the guide rails 48, while when the screw rod 47 is rotated in the opposite direction, the elevating block 49 is moved upwardly.

Figure 13:
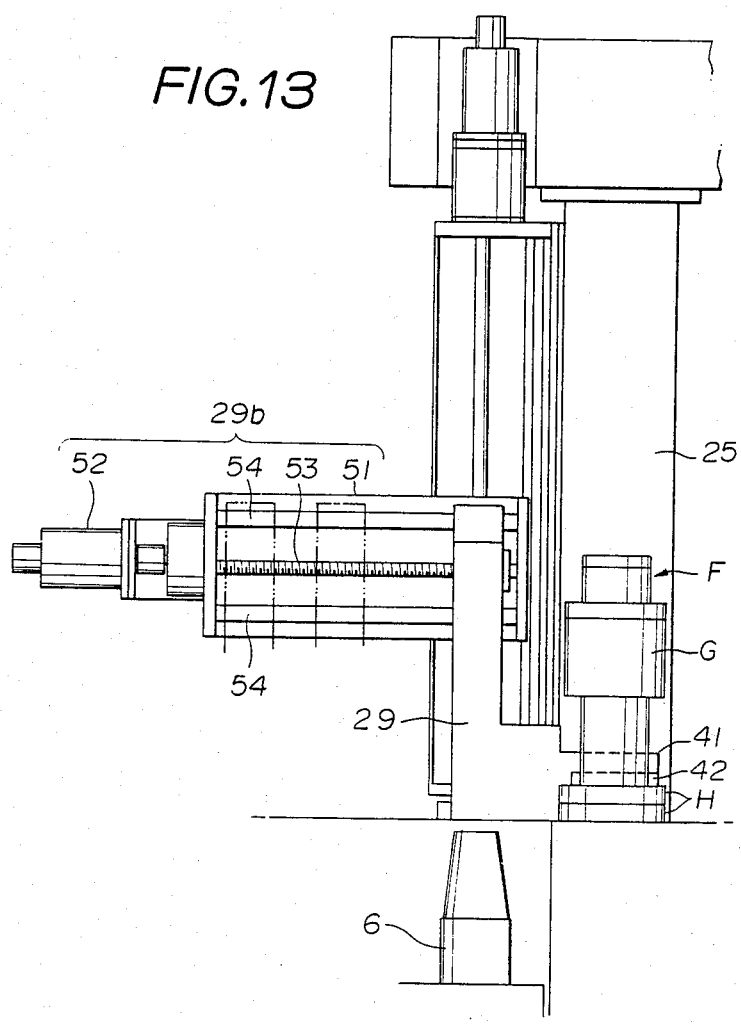
FIG. 13 is a view as viewed from the arrows XIII—XIII in FIG. 12.

As shown in FIGS. 13 and 14, the radially moving mechanism 29b comprises a connecting bracket 51 which is fixedly mounted to the elevating block 49 of the vertically moving mechanism 29a and which extends radially horizontally. A horizontally extending screw rod 53 rotated by an electric motor 52 is threadedly engaged with the grip bracket 29. A pair of guide rods 54 extend in parallel with the horizontal screw rod 53 for guiding the grip bracket 29 horizontally. When the screw rod 53 is rotated by the motor 52 in one direction, the grip bracket 29 is moved radially outwardly along the guide rods 54, while when the screw rod 53 is rotated in the opposite direction, the grip bracket 29 is moved radially inwardly along the guide rods 54.

As shown in FIGS. 6 and 10, the pins 6 for receiving the respective nuts G project from the upper surface of the scaffold device 4 and are arranged in correct conformity in number and pitch angle with the stud bolts F. Each of the pins 6 has a large diameter portion 56 about which corresponding ones of the washers H can be fitted. The pin 6 also has a small diameter portion 57 which is tapered or stepped and about which a corresponding one of the nuts G can be fitted such that the nut G is supported in vertically spaced relation from the washers H fitted about the large diameter portion 56.

Figure 16:
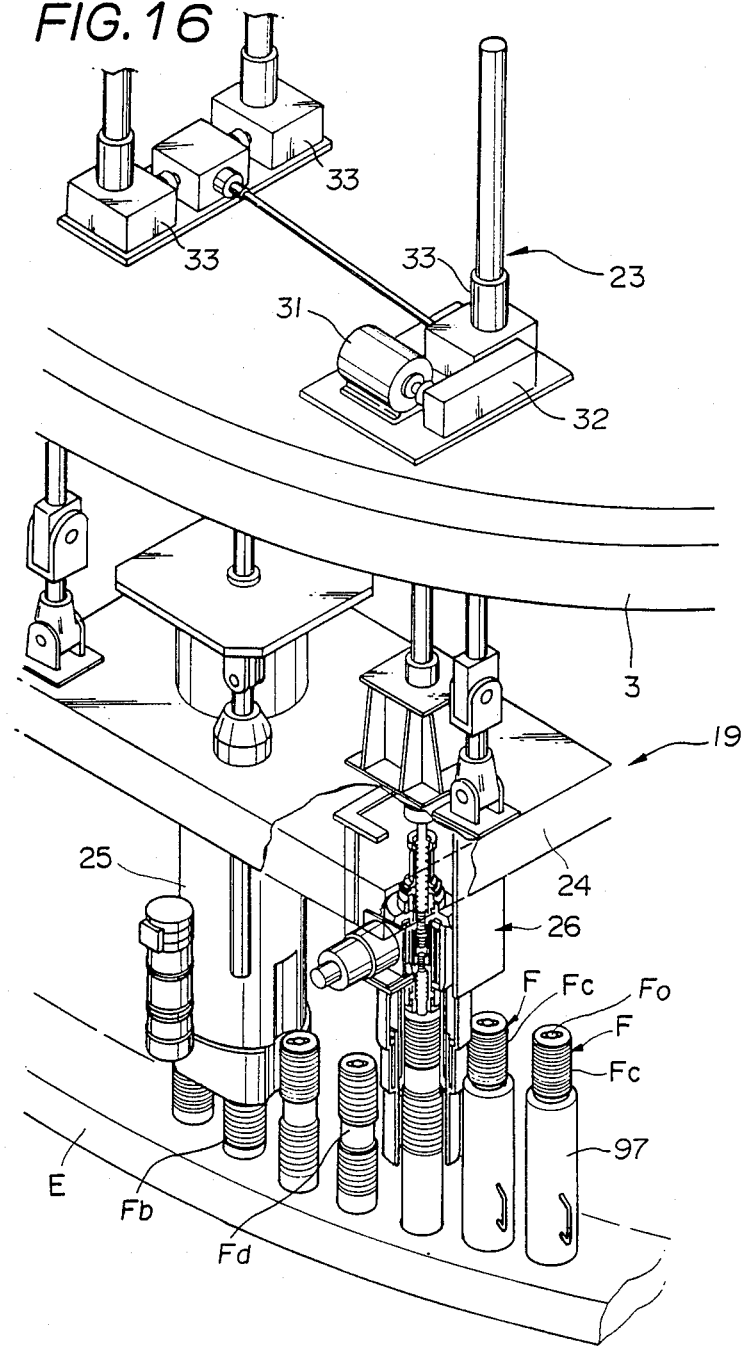
FIG. 16 is a perspective view of a stud bolt attaching and detaching device illustrated in FIG. 10.
Figure 17:
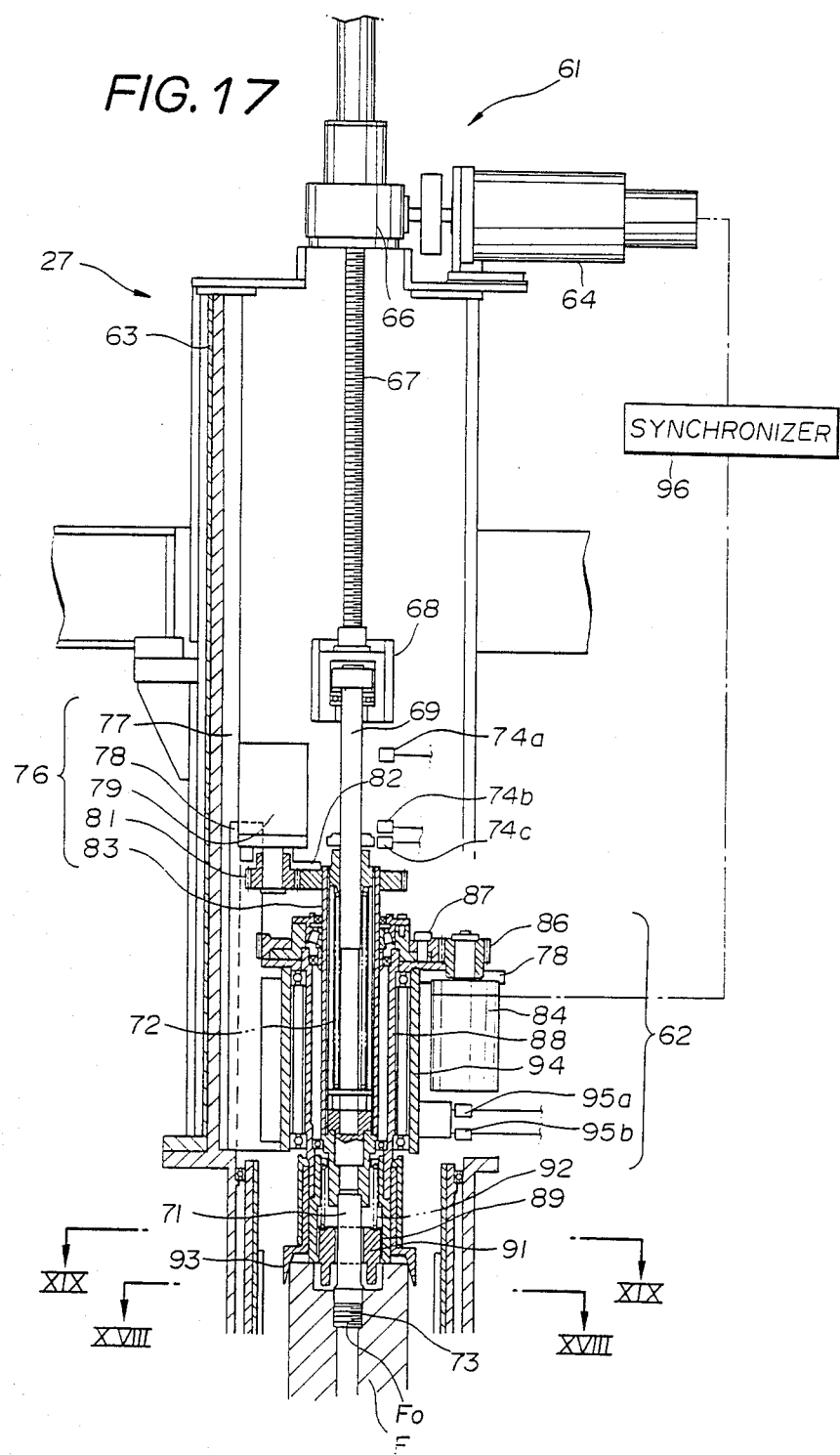
FIG. 17 is a vertical cross-sectional view of the stud bolt attaching and detaching device shown in FIG. 16.
Figure 18:
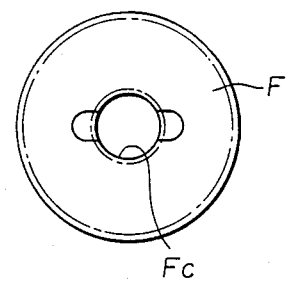
FIG. 18 is a view as viewed from the arrows XVIII—XVIII in FIG. 17.
Figure 19:
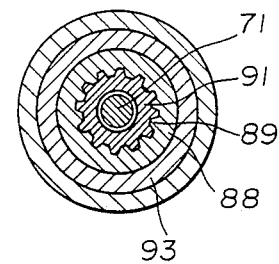
FIG. 19 is an enlarged cross-sectional view taken along the line XIX—XIX in FIG. 17.

As shown in FIGS. 16 and 17, the stud bolt attaching and detaching device 27 of each of the operating units 19 is fundamentally composed of a bolt hanging section 61 and a bolt loosening section 62. The bolt hanging section 61 is mounted to the unit table 24 which is supported by the turntable 3. The bolt loosening section 62 is supported for vertical movement toward and away from a corresponding one of the stud bolts F. A casing 63 is fixedly mounted vertically to the unit table 24 by means of bolt and nut assemblies. Component parts of the bolt hanging section 61 are arranged on an upper outside and an inside of the casing 63. The bolt loosening section 62 is supported within the casing 63 for vertical movement.

The stud bolt attaching and detaching device 26 will be described in more detail with reference to FIGS. 16 through 19. The bolt hanging section 61 of the stud bolt attaching and detaching device 26 comprises an electric motor 64 mounted on a top outer end face of the casing 63. A vertically moving mechanism 66 such as, for example, a screw jack or the like is adapted to be driven by the motor 64 to convert rotational motion to vertical motion. A vertical screw rod 67 is provided which is rotatively driven by the vertically moving mechanism 66 for vertical movement within the casing 63 toward and away from the stud bolt F. A rotatable rod 69 is connected through a coupling 68 to a lower end of the vertical screw rod 67 for rotation about the vertical axis. A hanging rod 71 is mounted for vertical movement relative to the rotatable rod 69, but for rotation with the rotatable rod 69. A resiliently biasing member 72 is interposed between the hanging rod 71 and the rotatable rod 69 for biasing the hanging rod 71 so as to move the same upwardly relative to the rotatable rod 69. The hanging rod 71 has its male threaded lower end portion 73 which is threadedly engageable with a threaded bore $F_o$ formed at a center of the head of the stud bolt F.

A plurality of position sensors 74a through 74c are arranged about the rotatable rod 69 for detecting the vertical position of the rotatable rod 69. A rotating mechanism 76 is also arranged about the rotatable rod 69. A vertical guide rail 77 is fixedly mounted to an inner surface of the casing 63. The rotating mechanism 76 comprises an elevating frame 78 is supported by the guide rail 77 for vertical movement therealong. An electric motor 79 fixedly mounted on the elevating frame 78 has an output shaft on which a gear 81 is mounted for rotation therewith. The gear 81 is in mesh with a gear mounted on the rotatable rod 69 for rotation therewith. An intermediate sleeve 83 is provided which surrounds the rotatable rod 69 and the hanging rod 71. The arrangement is such that rotational driving force from the motor 79 is transmitted to the intermediate sleeve 83 through the gears 81 and 82 to rotate the hanging rod 71 fixedly connected to the intermediate sleeve 83.

The bolt loosening section 62 comprises an electric motor 84 mounted on the elevating frame 78. The motor 84 has an output shaft on which a gear 86 is mounted for rotation therewith. The gear 86 is in mesh with a gear 87 which is mounted on an outer sleeve 88 for rotation therewith. The outer sleeve 88 surrounds the intermediate sleeve 83 with an annular gap left therebetween. A wrench element 91 is connected to a lower end of the outer sleeve 88 through splines 89. The arrangement is such that rotational driving force of the motor 84 is transmitted to the outer sleeve 88 through the gears 86 and 87 to rotate the wrench element 91 hanging from the outer sleeve 88 through the splines 89. A resiliently biasing member 92 arranged within the lower portion of the outer sleeve 88 is interposed between the wrench element 91 and the outer sleeve 88 to tend to project the wrench element 91 downwardly. A positioning sleeve 93 is fitted about the lower end portion of the outer sleeve 88. The positioning sleeve 93 has an inner tapered surface which is adapted to be fitted about the head of the stud bolt F to center the wrench element 91 with respect to the stud bolt F. A support sleeve 94 is fixedly mounted to the elevating frame 78 for rotatably supporting the outer sleeve 88. A plurality of vertical position sensors 95a and 95b are arranged about the support sleeve 94 for detecting the positional relationship between the support sleeve 94 and the stud bolt F.

The motor 84 of the bolt loosening section 62 is connected to the motor 64 of the bolt hanging section 61 through a synchronizer 96 such that an amount of vertical movement of the stud bolt F due to rotation thereof by the wrench element 91 is brought into conformity with an amount of vertical movement of the hanging rod 71. That is to say, the synchronizer 96 is so designed as to control the motor 64 to bring an amount of vertical movement of the screw rod 67 due to the vertically moving mechanism 66 into conformity with the amount of vertical movement of the stud bolt F due to rotation thereof.

In FIG. 16, the reference numeral 97 designates a sleeve for supporting a corresponding one of the stud bolts F. The sleeve 97 is vertically split into two halves. The two halves of the sleeve 97 are fitted about the stud bolt F released from threaded engagement with the flange D of the body B of the reactor pressure vessel A in such a manner that the sleeve 97 is in engagement with a stepped portion Fd of the stud bolt F to support the same in hanging relation to the flange E of the lid C.

As mentioned previously, the positioning arrangement for positioning the turntable 3 with respect to the stud bolts F comprises the plurality of position detecting devices 20 schematically illustrated in FIG. 7. The position detecting devices 20 will be described in detail with reference to FIGS. 9 and 20. As shown in FIG. 9, each of the position detecting devices 20 comprises a sensor S located at a predetermined radial position from the center of the turntable 3 for detecting a radial distance to a corresponding one of the stud bolts F closest to the sensor S, to generate signals representative of the radial distance. As shown in FIG. 20, the signals from the respective sensors S are sent to a control unit 98 where the signals are processed to detect a center offset between the center of the turntable 3 and the center of the sling 2 fixed to the lid C and a circumferential offset between each of the sensors S and a corresponding one of the stud bolts F closest to the sensor S. Connected to the control unit 98 are the motors 10 of the respective drive devices 8 and the hydraulic cylinders 16c of the respective centering devices 9.

A radius R of each of the sensors S from the center of the turntable 3 is set to $R=R_1+r+\delta$, where $R_1$ is a radius of the pitch circle of the stud bolts F, r is a radius of the stud bolt F, and $\delta$ is a reference spacing distance.

The position detecting devices 20 having their respective sensors S are provided in plural pairs arranged in circumferentially equidistantly spaced relation on a circle having the radius R from the center of the turntable 3. Each pair of sensors S are opposed diametrically with respect to the center of the turntable 3. Each of the sensors S detects the distance to the stud bolt F closest to the sensor S to generate the signals. The signals from the respective sensors S are sent to the control unit 98 where the signals are processed to generate correction signals representative of the center offset between the center of the turntable 3 and the center of the sling 2 and the circumferential offset between each of the sensors S and the stud bolt F closest to the sensor S. The motors 10 of the respective drive devices 8 described previously with reference to FIGS. 8 and 9 are operative in response to the signals from the control unit 98 to turn the turntable 3 in the horizontal plane relative to the sling 2 to bring the operating units 19 into vertical alignment with the stud bolts F. The hydraulic cylinders 16c of the respective centering devices 9 are also operative in response to the signals from the control unit 98 to move the respective rollers 15 radially, thereby translating the turntable 3 in the horizontal plane so as to bring the center of the turntable 3 into conformity with the vertical axis passing through the center of the lid C.

The sensors S of the respective position detecting devices 20 may be optical, magnetic or mechanical sensors.

The operation of the vessel lid mounting and demounting apparatus 1 constructed as mentioned above will next be described.

Demounting of the lid C from the body B will first be described. The apparatus 1 stored on the operating floor is hung up by a crane and is lowered onto the top of the reactor pressure vessel A. The legs 26 of the sling 2 are connected respectively to the sling fittings Ca on the lid C. The position sensors S of the respective position detecting devices 20 detect the position of the turntable 3 relative to the stud bolts F. In response to the signals from the sensors S, the control unit 98 supplies correction signals to the hydraulic cylinders 16c of the respective centering devices 9. The centering devices 9 are operated to bring the center of the turntable 3 into alignment with the center of the pitch circle of the stud bolts F. Thus, the apparatus 1 is mounted in position on the top of the reactor pressure vessel A.

Subsequently, the scaffold holding devices 21 are operated to lower the scaffold device 4 onto the structural portion T for the pressure vessel A. After the scaffold device 4 is fixed onto the structural portion T, the scaffold holding devices 21 are removed from the turntable 3 so as not to interfere with the subsequent various operations.

Subsequently, the unit elevating devices 23 are operated to lower the respective unit tables 24 together with their respective operating units 19. The motors 10 of the respective drive devices 8 are operated in response to the correction signals from the control unit 98 to position the turntable 3 in the circumferential direction so as to bring the respective operating units 19 into vertical alignment with the stud bolts F. By this positioning, the stud tensioner 25 of each of the operating units 19 is vertically aligned with the stud bolt F having threadedly engaged therewith the nut G to be loosened. As shown in FIG. 10, the stud bolt attaching and detaching device 26 of the operating unit 29 is located at a position spaced circumferentially three times the pitch of the stud bolts F. The nut transporting device 27 stands ready adjacent the stud bolt F vertically aligned with the stud tensioner 25.

The stud tensioner 25 is operated to grip the threaded grip portion Fc of the stud bolt F and to pull up the same. While stretching the stud bolt F, the stud tensioner 25 rotates the nut G to gradually release threaded engagement thereof with the threaded portion Fb of the stud bolt F. The stud tensioner 25 is moved upwardly by the tensioner elevating mechanism 35 in synchronism with vertical movement of the nut G due to rotation thereof. After the nut G is released from threaded engagement with the threaded portion Fb of the stud bolt F, the stud tensioner 25 is further moved upwardly to a location above the stud bolt F. The loosened nut G is supported on the stud bolt F in fitted relation thereto above the threaded portion Fb thereof.

The radially moving mechanism 29b of the nut transporting device 27 is operated to move the grip bracket 29 to a location radially outwardly from the pitch circle of the stud bolts F. The vertically moving mechanism 29a is then operated to lower the grip bracket 29 to location the same in level as the threaded portion Fb of the stud bolt F, as indicated by the phantom lines 29' in FIG. 12. Subsequently, the radially moving mechanism 29b is operated to move the grip bracket 29 radially inwardly toward the threaded portion Fb of the stud bolt F. This brings the engaging recess 41 in the tip of the grip bracket 29 into engagement with the stud bolt F.

With the grip bracket 29 fitted about the stud bolt F, the vertically moving mechanism 29a is operated to slightly move the grip bracket 29 downwardly to bring the washer attracting element 42 to a location close to the washers H on the flange E of the lid C, thereby causing the washer attracting element 42 to magnetically attract the washers H, as shown in FIG. 12. Subsequently, the vertically moving mechanism 29a is operated to upwardly move the grip bracket 29 having attracted thereto the washers H, as indicated by the phantom lines 29" in FIG. 12. In the course of the upward movement, the grip bracket 29 is brought into engagement with the lower surface of the nut G so that the nut G is placed on the grip bracket 29. Thus, the grip bracket 29 can remove the nut G and the washers H out of the stud bolt F.

With the nut G and the washers H held respectively on the upper and lower surfaces of the tip of the grip bracket 29, the grip bracket 29 is moved upwardly to a location spaced above the stud bolt F. Then, the radially moving mechanism 29b is operated to move the grip bracket 29 having supported thereon the nut G and the washers H, to a location radially outwardly of the pitch circle of the stud bolts F as indicated by the phantom lines 29''' in FIG. 14, to space the grip bracket 29 away from the stud bolt F.

The nut G and the washers H are vertically aligned with the corresponding pin 6 and, subsequently, the vertically moving mechanism 29a is operated to move downwardly the grip bracket 29 having supported thereon the nut G and the washers H, to fit the nut G and the washers H respectively about the small and large diameter portions 57 and 56 of the pin 6.

The nut G is placed on and supported by the small diameter portion 57 of the pin 6. The washers H are fitted about the large diameter portion 56 of the pin 6, but are still maintained magnetically attracted to the washer attracting element 42. Under such condition, as the radially moving mechanism 29b is operated to move the grip bracket 29 radially outwardly, the nut G and the washers H tend to maintain engagement with the pin 6 and are retained on the pin 6. Thus, only the grip bracket 29 can be moved away from the pin 6.

In the manner described above, the nut G and the washers H are retained, as shown in FIG. 12, on the pin 6 which is spaced radially outwardly from the stud bolt F about which these nut G and washers H have been fitted. Operations similar to those described above are repeated to successively remove the nuts G and the washers H from the respective stud bolts F. Such removing operations of the nuts G and the washers H are effected while the turntable 3 is turned one pitch by one pitch of the stud bolts F. However, since the operating units 19 are arranged at four locations, the entire nuts G and washers H can be removed while the turntable 3 is turned through one fourth of one revolution, i.e., 90 degrees.

After the removal of the entire nuts G and washers H from the respective stud bolts F, a required number of stud bolts F are detached by the stud bolt attaching and detaching devices 26 of the respective operating units 19. Detaching of the stud bolts F from the flange D of the body B is effected after the required number of stud bolts F are brought by the stud tensioners 25 to such a condition that the stud bolts F can be detached.

Each of the unit elevating devices 23 is operated to gradually move the corresponding unit table 24 downwardly. Subsequently, the vertically moving mechanism 66 of the bolt hanging section 61 of the stud bolt attaching and detaching device 27 is operated by the motor 64 to move downwardly the elevating frame 78 supported in hanging relation to the rotatable rod 69 and the positioning sleeve 93 hung from the outer sleeve 88, along the guide rail 77 to a position at the lower end of the guide rail 77. The vertical position of the support sleeve 94 is detected by the position sensors 95a and 95b, to fit the positioning sleeve 93 about the head of the stud bolt F as shown in FIG. 17. Thus, the wrench element 91 is centered with respect to the stud bolt F. By this centering, the male threaded portion 73 at the lower end of the hanging rod 71 of the bolt hanging section 61 is vertically aligned with the threaded bore Fo in the stud bolt F.

The vertically moving mechanism 66 is operated by the motor 64 to move the screw rod 67 downwardly to bring the male threaded portion 73 of the hanging rod 71 into engagement with the threaded bore Fo in the stud bolt F. The positional relationship between the male threaded portion 73 and the stud bolt F is detected by the position sensor 74b. The motor 84 is operative in response to the signals from the position sensor 74b to rotate the hanging rod 71 through the intermediate sleeve 83, thereby bringing the male threaded portion 73 into threaded engagement with the threaded bore Fo in the stud bolt F. During such threaded engagement, the motor 64 is operated to move the hanging rod 71 downwardly in synchronism with an amount of downward movement of the hanging rod 71 due to threaded engagement of the male threaded portion 73 with the threaded bore Fo in the stud bolt F. The amount of downward movement of the hanging rod 71 is detected by the position sensor 74c.

After completion of threaded engagement of the male threaded portion 73 with the threaded bore Fo in the stud bolt F, the bolt hanging section 61 is operated to bias the stud bolt F upwardly. That is to say, the screw rod 67 and the rotatable rod 69 are moved upwardly to resiliently deform the biasing member 72, and an amount of movement of the rotatable rod 69 is detected by the position sensors 74a and 74b. The position sensor 74b detects that the pulling-up force on the stud bolt F due to the rotatable rod 69 is substantially zero, while the position sensor 74a detects that the pulling-up force reaches a set load, for example, a load of a weight of the stud bolt F in addition to the own weight of the bolt loosening section 62.

The motor 84 of the bolt loosening section 62 is operated to rotate the wrench element 91 through the outer sleeve 88 and the splines 89 to loosen the stud bolt F. During the loosening, the stud bolt F is supported along with its weight by the bolt hanging section 61, i.e., in a so-called non-load state. This makes it possible to restrain rotational torque at the loosening to a low value. The bolt loosening section 62 is moved upwardly with upward movement of the stud bolt F due to loosening thereof, so that the positional relationship between the bolt loosening section 62 and the stud bolt F is maintained unchanged.

The bolt hanging section 61 is operated to move upwardly the screw rod 67 and the rotatable rod 69 in synchronism with upward movement of the stud bolt F due to loosening thereof, to maintain the constant positional relationship between the rotatable rod 69 and the hanging rod 71. Thus, the stud bolt F can smoothly be rotated and moved upwardly while the load of the stud bolt F is resiliently supported by the biasing member 72.

In the manner as described above, the requisite number of the stud bolts F are pulled out of the threaded bores in the flange D of the body B of the pressure vessel A, and are conveyed to the requisite location. If necessary, as shown in FIG. 16, the two halves of the support sleeve 97 are fitted about each of the removed stud bolts F in such a manner that the two halves are in engagement with the stepped portion Fd of the stud bolt F, to support the stud bolt F on the flange E of the lid C so as to be hung by the support sleeve 97.

After the entire nuts G and washers H have been removed from the stud bolts F, and after the detached stud bolts F have been supported respectively by the support sleeves 97 on the flange E of the lid C as shown in FIG. 16, the scaffold holding devices 21 are connected to the scaffold device 4 to move the same upwardly from the structural portion, T for the reactor pressure vessel A, so that the scaffold device 4 is hung from the sling 2. The crane is connected to the sling fitting 2c on the sling 2 to hang the same together with the turntable 3, the upper lid C, the scaffold device 4 and the like, to convey them to the storage location on the operating floor.

Thus, demounting of the lid C from the body B of the reactor pressure vessel A is completed.

Mounting of the demounted lid C on the body B is effected by the steps of procedure substantially reverse to those described above. Mounting of the demounted lid C on the body B will not therefore be described in detail, but described below briefly.

The lid C, the stud bolts F supported on the flange E of the lid C and the like, which are stored on the operating floor, are hung together with the sling 2 and the turntable 3 by the crane, and are lowered onto the body B. Requisite positioning operations are effected. Stud bolts F, which are not supported by the support sleeves 97 on the flange E of the lid C, if any, are transported to locations respectively adjacent the through bores in the flange E of the lid D, and are inserted respectively into the through bores in the flange E. In this manner, the entire stud bolts F are brought to their respective upstanding positions from the through bores in the flange E.

Subsequently, the stud bolt attaching and detaching devices 26 of the respective operating units 19 are operated. Specifically, the bolt hanging section 61 of each of the stud bolt attaching and detaching devices 26 supports a corresponding one of the stud bolts F such that frictional force due to the load of the stud bolt F does not directly act upon between the threads on the threaded bore in the flange D of the body B and the threads on the threaded portion Fa of the stud bolt F. While such condition is maintained, the bolt loosening section 62 is operated to bring the stud bolt F into threaded engagement with the threaded bore in the flange D of the body B. In this manner, the stud bolts F are successively screwed respectively into the threaded bores in the flange D of the body B. The screwed stud bolts F have their respective upper end portions which project upwardly from the flange E of the lid C.

The grip bracket 29 of each of the nut transporting devices 27 is inserted between the nut G and the washers H on the pin 6. The grip bracket 29 is moved upwardly, with the nut G supported on the grip bracket 29, and with the washers H magnetically attracted to the grip bracket 29, to disengage the nut G and the washers H from the pin 6. The grip bracket 29 is then moved radially upwardly to the position above the stud bolt F. The grip bracket 29 is then moved downwardly to permit the nut G to be loosely fitted about the section of the stud bolt F above the threaded portion Fb thereof. The grip bracket 29 is then moved radially away from the stud bolt F so that the washers H are released from the magnetic attraction due to the grip bracket 29 and descend along the stud bolt F onto the flange E of the lid C.

Subsequently, the nut G is rotated and threadedly engaged with the threaded portion Fb of the stud bolt F, and is tightened by the stud tensioner 25.

In the manner as described above, the entire nuts G are successively tightened onto the flange E of the lid C through the washers H. Thus, mounting of the lid C on the body B is completed.

As will be seen from the above description, the arrangement of the vessel lid mounting and demounting apparatus 1 according to the embodiment of the invention is such that a plurality of operating units 19 each having the stud bolt attaching and detaching device 26 and the nut transporting device 27 are arranged in circumferentially spaced relation on the circle concentric to the center of the turntable 3. With such arrangement, movement of the turntable 3 in the horizontal plane relative to the sling 2 makes it possible for the operating units 19 to simultaneously be adjusted in their positions, while the operating units 19 maintain their positional relationship. Accordingly, if the turntable 3 is moved by the drive devices 8 and the centering devices 9 in response to the detecting signals from the position detecting devices 20, the plurality of the operating units 19 can simultaneously be positioned with respect to the center of the pitch circle such that the operating units 19 are vertically aligned with the stud bolts F and the nuts G arranged on the circle concentric to the center of the lid C.

Accordingly, when the lid mounting and demounting apparatus 1 is mounted on the lid C, it is possible to shorten a period of time required for the centering of the operating units 19.

Further, since the turntable 3 is determined in its vertical position by the rollers 5, it is sufficient for centering of the turntable 3 to translate the same only in the horizontal plane. Therefore, each of the centering devices 9 arranged between the turntable 3 and the sling 2 for adjusting the position of the turntable 3 can be formed by a relatively simple construction which, for example, comprises the actuating assembly 16 employing the hydraulic cylinder 16c for actuating the roller 15 to move the same radially. Thus, the apparatus 1 can be simplified in construction, making it possible to reduce the manufacturing cost.

The arrangement of the position detecting devices 20 are such that at least one pair of sensors S are arranged in diametrically opposed relation to the center of the turntable 3, with the radial distances of the respective sensors S from the center of the turntable 3 equal to each other, and that each of the sensors S detects a distance to a corresponding one of the stud bolts F closest to the sensors. With such arrangement, if the sensors S detect an offset in position of the turntable 3 with respect to the stud bolts F, the turntable 3 is turned about the sling 2 through an appropriate angular extent less than 90 degrees while continuing the position detection by the sensors S. This makes it possible to collectively grasp an amount of eccentricity of the turntable 3 with respect to the stud bolts F arranged on the circle concentric to the center of the lid C, i.e., an offset in circumferential position of the turntable 3 with respect to the center of the lid C. Thus, position adjustment of the turntable 3 can be effected more accurately and rapidly.

The nut transporting device 27 of each of the respective operating units 19 is arranged such that the grip bracket 29 is provided which is movable radially horizontally and vertically with respect to the unit table 24. Arranged between the grip bracket 29 and the unit table 24 are the vertically moving mechanism 29a for the grip bracket 29 and the radially moving mechanism 29b for the grip bracket 29. The nut supports or pins 6 are arranged in radial alignment with the respective stud bolts F in radially spaced relation thereto. With such arrangement, transportation of the nuts G by the vertically and radially moving mechanisms 29a and 29b is effected only in the vertical plane passing through the center of the lid C. Thus, working strokes of the nut transporting device 27 can be shortened, making it possible to reduce the size or dimension of the apparatus 1. It is also possible to speed up the operation of the apparatus 1, resulting in an increase in efficiency. Moreover, since transportation of the nuts G is limited to the vertical plane, it is possible to prevent the stud bolts F and the nuts G from being mingled in use with each other.

The stud bolt attaching and detecting device 27 of each of the operating units 19 is arranged such that the bolt hanging section 61 mounted to the unit table 24 comprises the hanging rod 71 which is vertically movable toward and away from the stud bolt F and which is threadedly engageable with the head of the stud bolt F. The bolt loosening section 62 is mounted for vertical movement relative to the unit table 24. The bolt loosening section 62 comprises the wrench element 91 which is rotatable about the axis of the hanging rod 71 and which is releasably engageable with the head of the stud bolt F. The vertically moving mechanism 66 is provided for moving the hanging rod 71 vertically in synchronism with vertical movement of the stud bolt F due to rotation thereof by the wrench element 91. Since the bolt hanging section 61 and the bolt loosening section 62 are mounted on the common unit table 24, it is possible to reduce the size of the stud bolt attaching and detaching device 27, and to improve accuracy thereof. Moreover, during loosening or tightening of the stud bolt F, the load of the stud bolt F is supported by the bolt hanging section 61. Thus, the stud bolt F can be rotated without being influenced by frictional resistant force due to load acting upon the stud bolt F, so that threaded engagement and disengagement of the stud bolt F can be made smooth and the operability can be improved. Further, vertical movement of the stud bolt F due to rotation thereof is absorbed by vertical movement of the bolt loosening section 62 relative to the unit table 24. The hanging rod 71 is moved vertically in synchronism with vertical movement of the stud bolt F due to rotation thereof such that the bolt hanging section 61 supports the load of the stud bolt F. This reduces the load on the threads of the stud bolt F and the threads of the corresponding threaded bore in the flange D of the body B, making it possible to restrain occurrence of damages on these threads and scattering of radioactive material.

The invention should not be limited to the above described specific forms. Various changes, modifications and variations may be made to the invention.

FIG. 21 shows a modification of the positioning arrangement for positioning the turntable 3 with respect to the stud bolts F. The positioning arrangement illustrated in FIG. 21 comprises at least one pair of tubular positioning jigs 101 and 101. These positioning jigs 101 and 101 are mounted respectively in hanging relation to unit tables supported by the turntable 3 for vertical movement, like the unit tables 24 shown in FIG. 10. Alternatively, the positioning jigs 101 and 101 may be supported directly by the respectively unit tables 24. The positioning jigs 101 and 101 are arranged in diametrically opposed relation on a circle concentric to the center of the turntable 3. The circle has a diameter $D_0$ in conformity with the diameter $D_1$ of the pitch circle of the stud bolts F. Each of the positioning jigs 101 has a lower end portion 102 which is tapered so as to diverge away from the turntable 3, i.e., toward the stud bolt F. The tapered end portion 102 has its maximum diameter which is set to allow a maximum dimension error $\delta_1$ occurring at mounting of the lid C on the body B. The pair of positioning jigs 101 and 101 are so designed as to be fitted respectively about diametrically opposed two of the stud bolts F to position the turntable 3 with respect to the lid C. Thus, the center of the turntable 3 is brought into conformity with the center of the pitch circle of the stud bolts F, and the operating units 19 shown in FIGS. 8 and 10 are brought into vertical alignment with the stud bolts F.

A vertically movable, straight tubular positioning jig 201 shown in FIG. 21 may be employed in substitution for each of the tapered positioning jigs 101 shown in FIG. 20. In case of the straight tubular positioning jig 201, a section of the stud bolt F projecting from the flange E of the lid C is covered with a tapered positioning jig 202 having a tapered portion 203. The straight tubular positioning jig 201 cooperates with the tapered positioning jig 202 to position the turntable 3 with respect to the stud bolts F.

Figure 23:
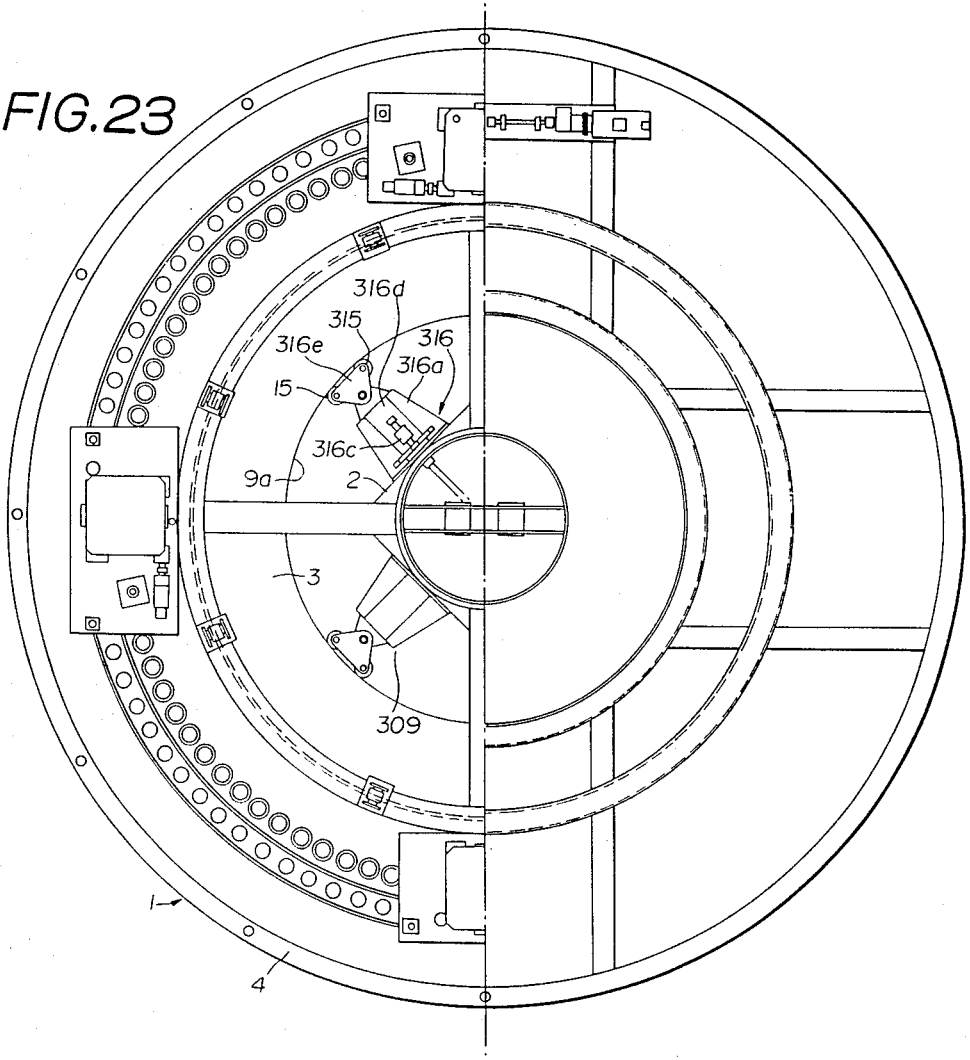
FIG. 23 is a view similar to FIG. 8, but showing a modification of centering devices of the positioning arrangement.

FIG. 23 shows a modification of the centering devices of the positioning arrangement, which can be used in substitution for the centering devices 9 described with reference to FIG. 8. Each of the centering devices designated by the reference numeral 309 in FIG. 23 comprises a pair of rollers 315 and 315 arranged in abutting relation to the reference surface 9a formed on the turntable 3, and an actuating assembly 316 which is operative in response to the signals from the position detecting devices 20 described with reference to FIG. 20. The actuating assembly 316 comprises a fixed arm 316a fixedly mounted to the sling 2 and extending horizontally from the sling 2 radially outwardly toward the reference surface 9a. A movable arm 316d is supported on the fixed arm 316 for radial movement relative thereto. An actuator such as, for example, a hydraulic cylinder 316c is mounted between the fixed and movable arms 316a and 316d. A triangular lever 316e has three apexes one of which is pivotally mounted to a radially outward end of the movable arm 316d. The above-mentioned rollers 315 are rotatably mounted respectively to the remaining two of the apexes of the triangular lever 316e. The hydraulic cylinder 316c is operative in response to the signals from the position detecting devices 20 shown in FIG. 20 to move the movable arm 316d radially toward and away from the reference surface 9a to cause the rollers 315 to urge the reference surface 9a, thereby translating the turntable 3 in the horizontal plane to center the turntable 3 so as to bring the center thereof into conformity with the center of the pitch circle of the stud bolts F.

The nut transporting device 27 of each of the operating units 19 has been described as comprising the grip bracket 29 which has the washer attracting element 42. However, such washer attracting element 42 may be dispensed with. In this case, the nut transporting device 27 handles only the nuts G. Further, although the washer attracting element 42 has been described as utilizing a permanent magnet, an electromagnet may be used in place of the permanent magnet.

Hydraulic or pneumatic piston and cylinder assemblies may be substituted for the above-described various electric motors.

Two or more stud bolt attaching and detaching devices 26 may be installed on each of the operating units 19. Further, four or more operating units 19 may be mounted on the turntable 3. The bolt attaching and detaching device 26 of each of the operating units 19 may use a bolt loosening section which applies intermittent impacts to a stud bolt to rotate the same, in substitution for the bolt loosening section 62. Furthermore, each of the operating units 19 may additionally comprises a cleaning device which is arranged adjacent the stud bolt attaching and detaching device 26 for cleaning a stud bolt to be attached or detached.

Moreover, the embodiment of the invention has been described as being applied to the reactor pressure vessel. It is needless to say, however, that the invention is applicable to any types of vessels other than the reactor pressure vessel, if the vessels each have a construction similar to that of the above-described reactor pressure vessel.

As described above, the arrangement of the vessel lid mounting and demounting apparatus according to the invention is such that a plurality of operating units each having the stud bolt attaching and detaching device and the nut transporting device are arranged in circumferentially spaced relation on the circle concentric to the center of the turntable. With such arrangement, if the turntable is moved in the horizontal plane relatively to the sling, the operating units supported by the turntable can simultaneously be adjusted in their positions with respect to the stud bolts, while the operating units maintain their positional relationship. Accordingly, when the lid mounting and demounting apparatus is mounted on the lid, it is possible to shorten a period of time required for the positioning of the operating units.

What is claimed is:

1. An apparatus for mounting and demounting a lid of a vessel on and from a body thereof, said lid and said body having their respective ring-like end flanges fastened to each other by means of a plurality of stud bolt and nut assemblies arranged in circumferentially spaced relation on a pitch circle concentric to a center of said lid, each of said stud bolt and nut assemblies including a stud bolt having an axis thereof extending vertically, and at least one nut threadedly engageable with the stud bolt, said apparatus comprising:

a sling to be fixed to said lid;
   a turntable supported on said sling for turning movement in a horizontal plane relative to said sling about a vertical axis passing through a center of said pitch circle;

drive means mounted between said sling and said turntable for turning the same about said vertical axis;

a plurality of operating units supported by said turntable and arranged in circumferentially spaced relation on a circle concentric to said vertical axis, which circle has a diameter equal to that of said pitch circle, each of said operating units including nut transporting means for transporting the nuts to and from the respective stud bolts, and stud bolt attaching and detaching means for attaching and detaching the stud bolts to and from said end flange of said body of said vessel; and positioning means for moving said turntable in the horizontal plane relatively to said sling so as to bring said operating units into vertical alignment with the stud bolts.

2. An apparatus as defined in claim 1, wherein said positioning means includes detecting means supported by said turntable for detecting a position of said turntable relative to said lid to generate signals representative of the position of said turntable, and centering means arranged between said sling and said turntable and operative in response to the signals from said detecting means for translating said turntable in the horizontal plane relatively to said sling to bring a center of said turntable into conformity with said vertical axis.

3. An apparatus as defined in claim 2, wherein said detecting means comprises at least one pair of sensors opposed to each other diametrically with respect to the center of said turntable such that a distance of one of said pair of sensors from the center of said turntable is equal to that of the other sensor from the center of said turntable, each of said sensors detecting a distance to a corresponding one of said stud bolts located closest to the sensor.

4. An apparatus as defined in claim 3, wherein said drive means is operative in response to the signals from said detecting means to turn said turntable so as to bring said operating units into vertical alignment with the stud bolts.

5. An apparatus as defined in claim 4, wherein said drive means comprises a ring gear mounted to said turntable in concentric relation to the center thereof, gear means rotatably mounted on said sling and movable between a first position where said gear means is in mesh with said ring gear and a second position where said gear means is disengaged from said ring gear, motor means for rotatively driving said gear means, and actuator means for moving said gear means between said first and second positions.

6. An apparatus as defined in claim 2, wherein said centering means comprises an annular reference surface formed on said turntable and extending in concentric relation to the center of said turntable, said reference surface being directed radially inwardly toward the center of said turntable, a plurality of roller means engageable with said reference surface, and a plurality of actuating means mounted to said sling and associated respectively with said roller means, said actuating means being operative in response to the signals from said detecting means for actuating respectively said roller means so as to move the same radially to cause said roller means to urge said reference surface thereby translating said turntable relative to said sling.

7. An apparatus as defined in claim 6, wherein each of said actuating means comprises an arm extending horizontally from said sling radially outwardly toward said reference surface, lever means pivotally mounted to said arm, and an actuator mounted to said arm and connected to one end of said lever means, said actuator being operative in response to the signals from said detecting means for pivotally moving said lever means, said lever means having the other end to which a corresponding one of said roller means is mounted rotatably.

8. An apparatus as defined in claim 6, wherein each of said actuating means comprises a movable arm extending horizontally from said sling radially outwardly toward said reference surface, and an actuator operative in response to the signals from said detecting means for moving said movable arm radially toward and away from said reference surface, said movable arm having a free end to which a corresponding one of said roller means is mounted rotatably.

9. An apparatus as defined in claim 1, wherein said positioning means comprises at least one pair of tubular positioning members depending from said turntable, said pair of tubular positioning members being arranged in diametrically opposed relation on the circle concentric to said vertical axis, said pair of tubular positioning members cooperating respectively with diametrically opposed two of the stud bolts to position said turntable with respect to the stud bolts.

10. An apparatus as defined in claim 9, wherein each of said tubular positioning members has a lower end portion tapered so as to diverge away from said turntable.

11. An apparatus as defined in claim 9, wherein said positioning means includes at least one pair of tapered positioning members fitted respectively about respective upper ends of diametrically opposed two of the stud bolts, said tapered positioning members being tapered so as to converge toward said turntable said tubular positioning members being straight and being adapted to be fitted respectively about said tapered positioning members.

12. An apparatus as defined in claim 1, wherein each of said operating units has a unit table supported by said turntable, said stud bolt attaching and detaching means of each of said operating units comprising bolt hanging means mounted on a corresponding one of said unit tables and bolt loosening means mounted on the corresponding unit table for vertical movement relative thereto, said bolt hanging means including a hanging rod extending vertically, said hanging rod having a lower and engageable threaded with a corresponding one of the stud bolts to support a weight thereof, and vertical moving means for moving said hanging rod vertically, said bolt loosening means including a rotatable wrench means engaged with an upper end of the corresponding stud bolt for turning the same about the axis thereof to loosen the corresponding stud bolt when said wrench means rotates in the first direction and to tighten the corresponding stud bolt when said wrench means rotates in a second direction opposite to said first direction.

13. An apparatus as defined in claim 12, wherein said bolt loosening means includes rotating means for rotating said wrench means in said first and second directions, said stud bolt attaching and detaching means further including means connected between said rotating means and said vertically moving means for synchronizing vertical movement of the corresponding stud bolt due to turning thereof by said wrench means with vertical movement of said hanging rod by said vertically moving means.

14. An apparatus as defined in claim 12, wherein each of said operating units includes means for vertically moving a corresponding one of said unit tables relative to said turntable.

15. An apparatus as defined in claim 1, wherein each of said operating units has a unit table supported by said turntable, said bolt transporting means of said operating units comprising a plurality of nut supports radially aligned respectively with the stud bolts in spaced relation thereto, said bolt transporting means of each of said operating units including a grip bracket, means for moving said grip bracket radially horizontally between the corresponding stud bolt and a corresponding one of said nut supports, and means for moving said grip bracket vertically, said bolt transporting means being arranged such that when a corresponding one of the nuts on said stud bolt is to be transported from a corresponding one of the stud bolts to a corresponding one of said nut supports, said grip bracket is brought into engagement with a lower surface of the corresponding nut, is moved vertically upward to disengage the corresponding nut from the corresponding nut support, is moved radially to the corresponding nut support, is moved vertically downward to permit the corresponding nut to be supported by the corresponding nut support, and is moved radially horizontally from the corresponding nut support to leave the corresponding nut on the corresponding nut support.

16. An apparatus as defined in claim 15 wherein said grip bracket includes means for magnetically attracting at least one washer on the corresponding stud bolt when the corresponding nut is to be transported from the corresponding stud bolt to the corresponding nut support.

17. An apparatus as defined in claim 15 wherein said nut supports are formed respectively by upstanding pins, each of said pins having a cylindrical lower portion and a tapered upper portion.

18. An apparatus as defined in claim 1, wherein each of said operating units includes means for vertically moving a corresponding one of said unit tables relative to said turntable.

19. An apparatus as defined in claim 1, wherein said vessel is a reactor pressure vessel.

\* \* \* \* \*